United States Patent
Campbell

(10) Patent No.: US 10,289,924 B2
(45) Date of Patent: May 14, 2019

(54) SYSTEM AND METHOD FOR SCANNED DOCUMENT CORRECTION

(71) Applicant: Sharp Laboratories of America (SLA), Inc., Camas, WA (US)

(72) Inventor: Richard John Campbell, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 106 days.

(21) Appl. No.: 15/359,314

(22) Filed: Nov. 22, 2016

(65) Prior Publication Data

US 2017/0076169 A1    Mar. 16, 2017

Related U.S. Application Data

(63) Continuation-in-part of application No. 15/203,889, filed on Jul. 7, 2016, which is a continuation-in-part (Continued)

(51) Int. Cl.
| | |
|---|---|
| *G06T 5/00* | (2006.01) |
| *G06K 9/34* | (2006.01) |
| *G06K 9/00* | (2006.01) |
| *G06T 3/00* | (2006.01) |
| *G06K 9/32* | (2006.01) |
| *G06T 7/13* | (2017.01) |

(52) U.S. Cl.
CPC ......... *G06K 9/344* (2013.01); *G06K 9/00463* (2013.01); *G06K 9/32* (2013.01); *G06T 3/0093* (2013.01); *G06T 5/006* (2013.01); *G06T 7/13* (2017.01); *G06T 2207/20076* (2013.01)

(58) Field of Classification Search
CPC . G06T 7/0012; G06T 7/11; G06T 7/12; G06T 5/006; G06T 7/13; G06T 2207/30176; G06K 9/46; G06K 9/4604; G06K 9/00771; G06K 9/00463; G06K 2009/363; G06K 9/00449; G06K 9/4633; G06K 9/2063
See application file for complete search history.

(56) References Cited

U.S. PATENT DOCUMENTS

| | | |
|---|---|---|
| 5,616,914 A | 4/1997 | Matsuda |
| 5,760,925 A | 6/1998 | Saund et al. |

(Continued)

*Primary Examiner* — Andrew M Moyer
*Assistant Examiner* — Dennis Rosario
(74) *Attorney, Agent, or Firm* — ScienBiziP, PC

(57) ABSTRACT

A system and method are provided for the correction of a warped page image. The method first accepts a camera image of a page, creates a filtered edge map, and identifies text-likely regions. The filtered edge map and text-likely regions are projected into a polar coordinate system to determine page lines and warped image page curves. An adaptive two-dimensional (2D) ruled mesh piecewise planar approximation of a warped page surface is created. A three-dimensional (3D) model is created using the adaptive 2D ruled mesh and the estimate of the camera focal length estimate. Using the 3D model, a 2D target mesh is created for rectifying the image of the page. In one aspect, the adaptive 2D ruled mesh is projected onto a 3D warped page surface using the estimated camera focal length and an estimated surface normal of each planar strip from the adaptive 2D ruled mesh.

24 Claims, 14 Drawing Sheets

Related U.S. Application Data of application No. 13/275,256, filed on Oct. 17, 2011, now Pat. No. 9,390,342.

(56) References Cited

U.S. PATENT DOCUMENTS

| | | | |
|---|---|---|---|
| 5,764,383 A | 6/1998 | Saund et al. | |
| 5,774,237 A | 6/1998 | Nako | |
| 6,330,050 B1 | 12/2001 | Takahashi et al. | |
| 7,001,024 B2 | 2/2006 | Kitaguchi et al. | |
| 7,283,655 B2 * | 10/2007 | Cline | G06T 7/0012 382/131 |
| 7,283,983 B2 * | 10/2007 | Dooley | G06F 3/017 706/20 |
| 7,324,706 B2 * | 1/2008 | Bassi | G06T 3/0006 345/643 |
| 7,463,772 B1 | 12/2008 | Lefevere et al. | |
| 8,229,227 B2 * | 7/2012 | Stojancic | G06K 9/00711 382/181 |
| 8,285,077 B2 | 10/2012 | Fero et al. | |
| 8,405,720 B2 * | 3/2013 | Gupta | H04N 17/002 348/143 |
| 9,066,038 B2 * | 6/2015 | Okumura | H04N 1/3878 |
| 9,214,015 B2 * | 12/2015 | Xu | G09G 5/10 |
| 9,495,587 B2 * | 11/2016 | Wilson | G06K 9/00463 |
| 9,501,692 B2 * | 11/2016 | Tyagi | G06K 9/00369 |
| 9,716,828 B2 * | 7/2017 | Yoo | H04N 5/23238 |
| 9,742,994 B2 * | 8/2017 | Agarwala | H04N 5/23238 |
| 2003/0198398 A1 | 10/2003 | Guan et al. | |
| 2004/0022451 A1 | 2/2004 | Fujimoto et al. | |
| 2005/0053304 A1 | 3/2005 | Frei | |
| 2010/0225937 A1 | 9/2010 | Simske et al. | |
| 2011/0211755 A1 | 9/2011 | Xu | |
| 2012/0202515 A1 * | 8/2012 | Hsu | G06Q 10/087 455/456.1 |
| 2012/0206778 A1 | 8/2012 | Shiria et al. | |
| 2012/0320427 A1 | 12/2012 | Zheng et al. | |
| 2013/0304399 A1 * | 11/2013 | Chen | G06T 7/0004 702/40 |
| 2015/0002642 A1 * | 1/2015 | Dressler | B60R 1/00 348/51 |
| 2017/0372134 A1 * | 12/2017 | Zagaynov | G06K 9/00442 |

* cited by examiner

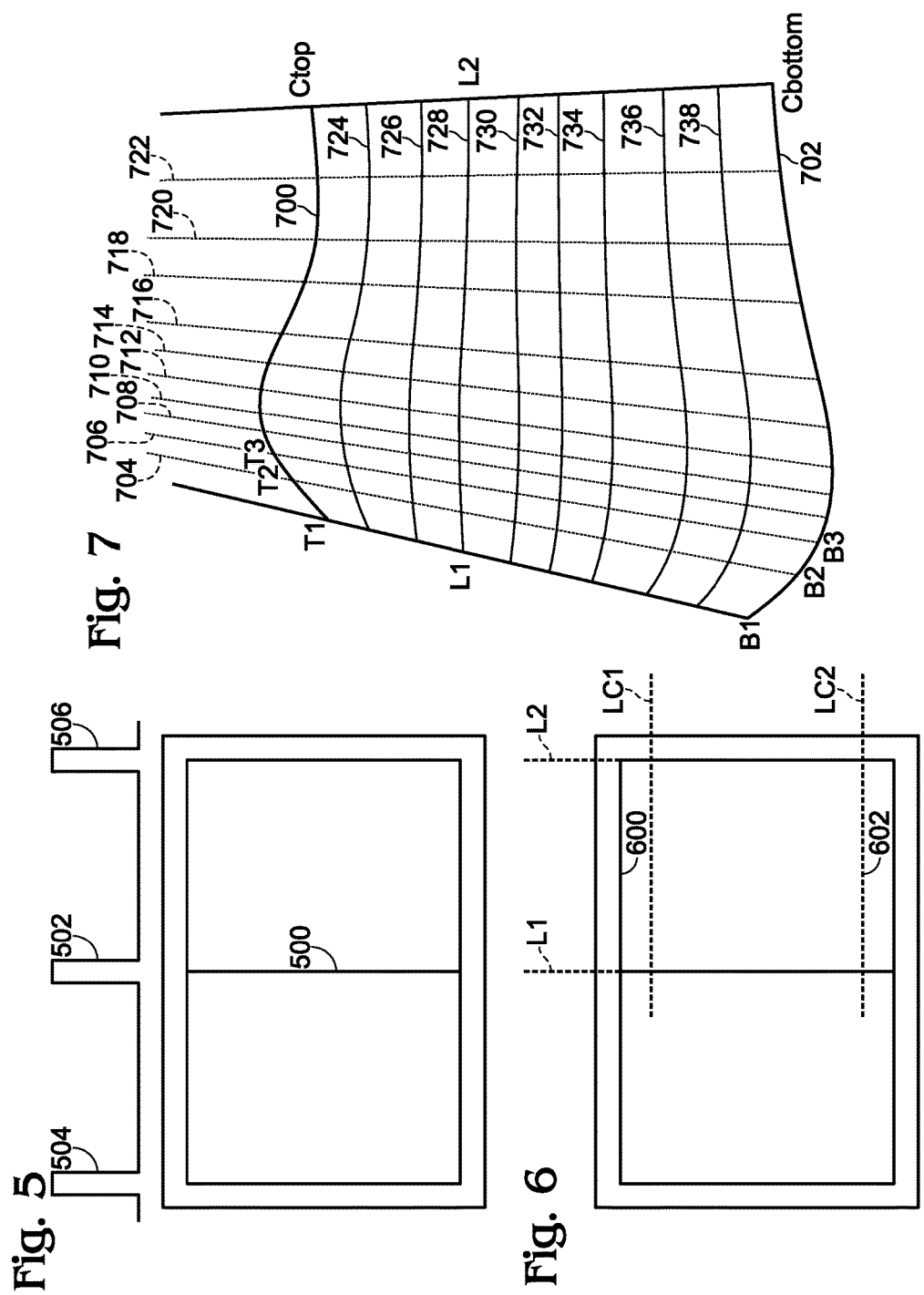

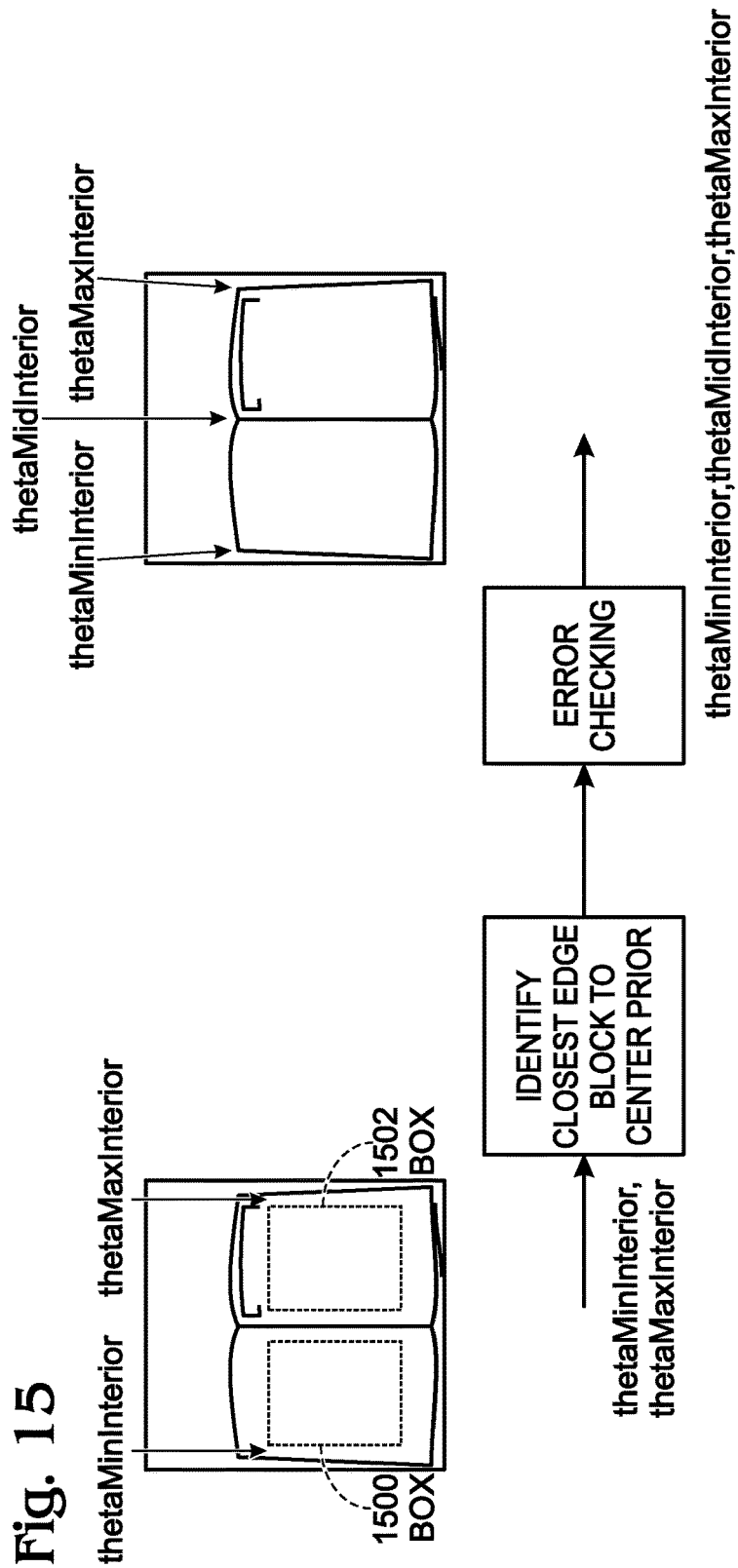

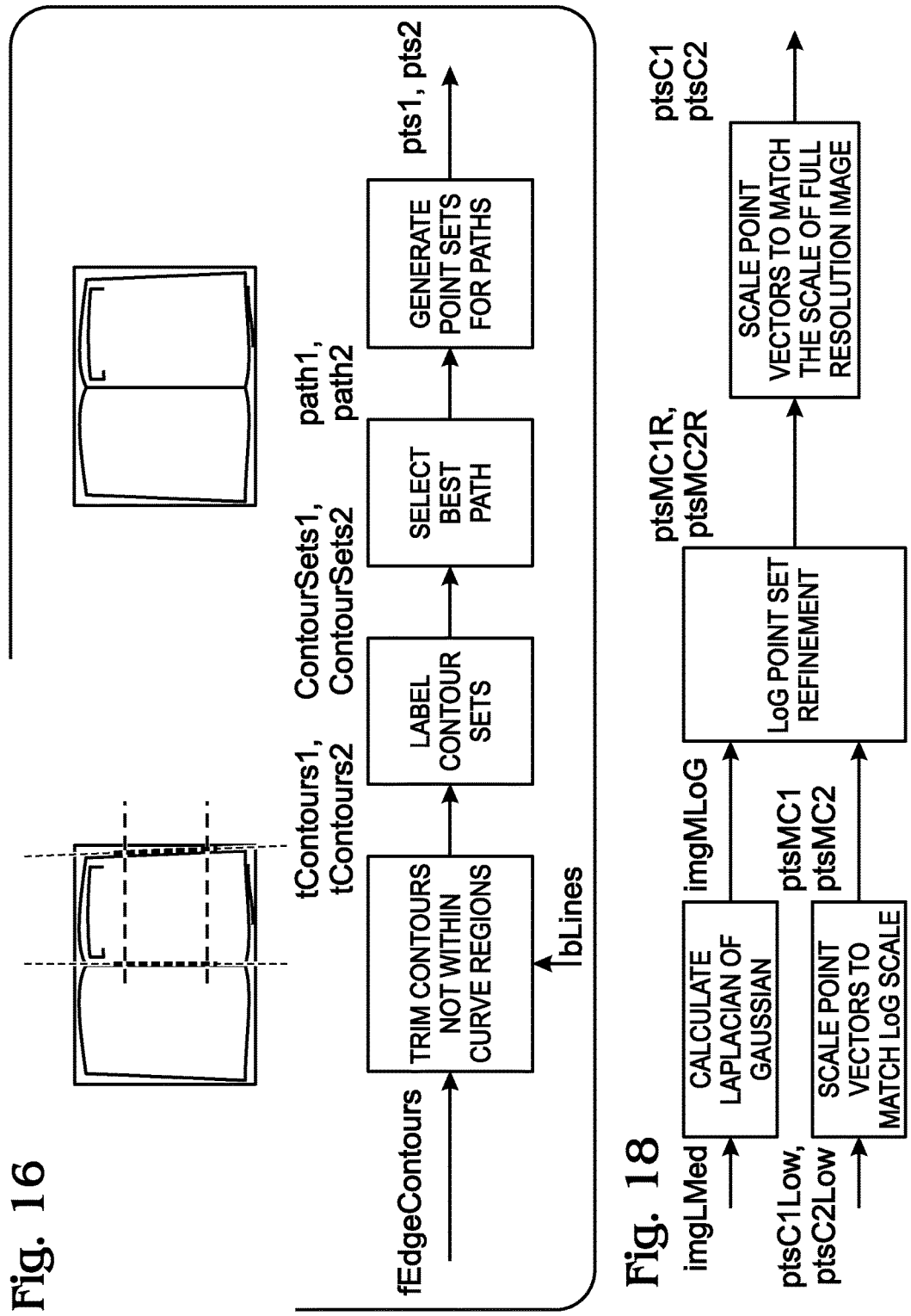

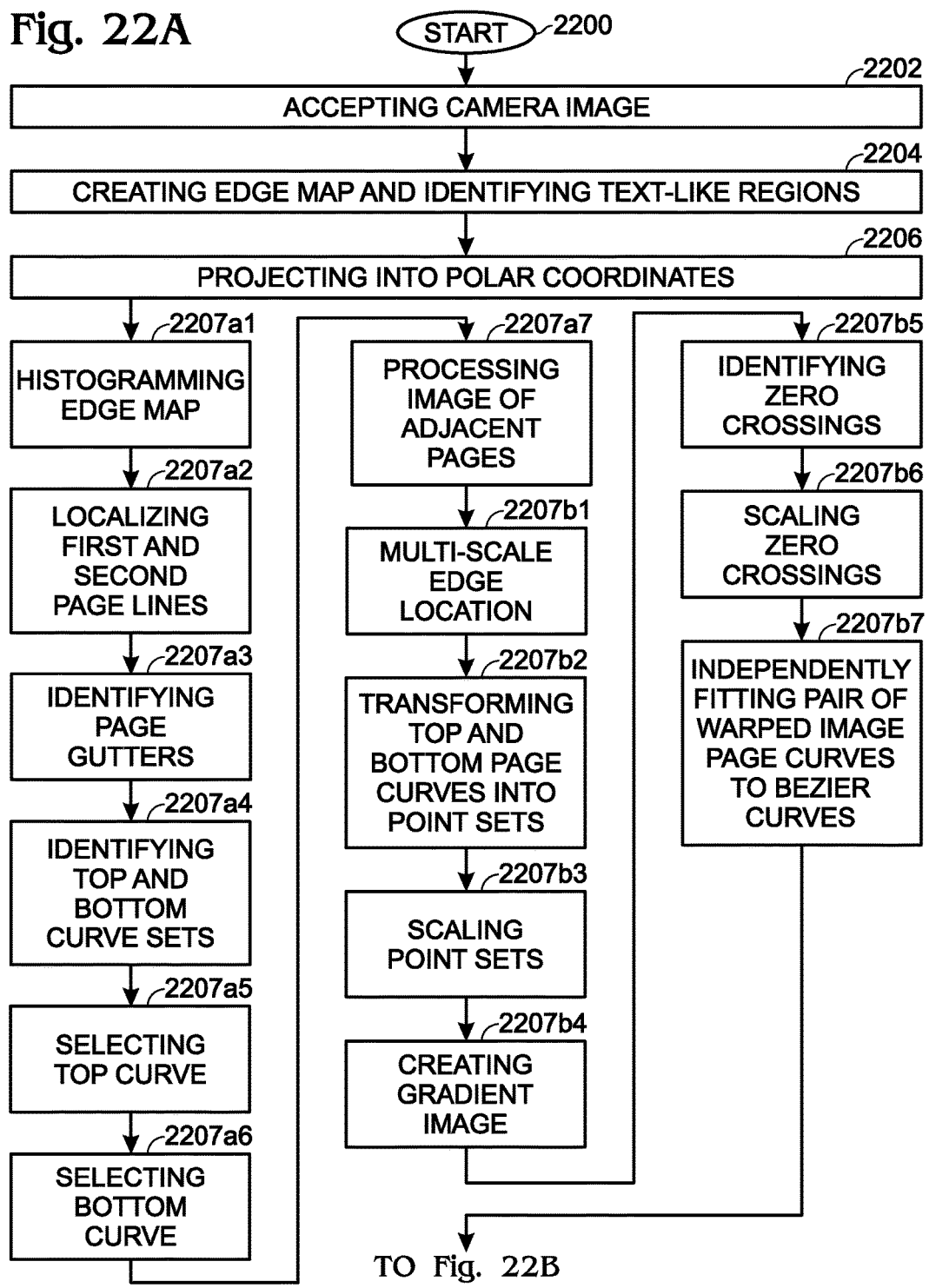

SYSTEM AND METHOD FOR SCANNED DOCUMENT CORRECTION

RELATED APPLICATION

This application is a Continuation-in-part of an application entitled, SYSTEM AND METHOD FOR NORMALIZED FOCAL LENGTH PROFILING, invented by Richard Campbell, Ser. No. 15/203,889, filed on Jul. 7, 2016, and published as US Patent Publication No. 2016/0314565, published on Oct. 27, 2016;

which is a Continuation-in-part of an application entitled, METHODS, SYSTEMS AND APPARATUS FOR CORRECTING PERSPECTIVE DISTORTION IN A DOCUMENT IMAGE, invented by Richard Campbell, Ser. No. 13/275,256, filed on Oct. 17, 2011, and issued as U.S. Pat. No. 9,390,342 on Jul. 12, 2016.

Both these application are incorporated herein by reference.

BACKGROUND OF THE INVENTION

Field of the Invention

This invention generally relates to camera-based scanners and, more particularly, to a system and method for correcting errors introduced in the process of document scanning.

Description of the Related Art

The scanning of a document with a handheld camera-enabled device is liable to introduce considerably more errors than if the same document was scanned, for example, on a dedicated flatbed device. Currently, most image correction techniques solve this problem by providing special backgrounds with known characteristics, active illumination, special lighting, a known camera pose, special hardware to hold book or minimize distortions, and/or multiple image captures in order to help estimate page geometry, simplify segmentation, and reduce shading artifacts. However, these techniques may introduce significant limitations on the use of the camera or distortion in the captured images.

It would be advantageous if a process existed for more accurately identifying document scanning errors related to focal length, page identification, and warping due to document binding.

SUMMARY OF THE INVENTION

Disclosed herein are a system and method that enable near scanner quality from camera captures of bound document content. The disclosed method identifies the page or pages of interest on an arbitrary background from ad hoc imaging locations, computes the 3D surface shape using multi-scale processing, and dewarps the image regions to produce images of each page, similar in quality to images obtained from scans of unbound content. This enables easy-to-use mobile scanning of bound documents and their reuse in document workflows, including optical character recognition (OCR), portable document format (pdf), and content extraction, etc. The disclosed method describes a multi-scale approach to flattening curved pages that often results from imaging bound content such as books and magazines. The method describes both single page and facing page detection and correction algorithms.

To detect the book page edges and gutters, the method algorithms first project the features into a polar coordinate system that restores parallel structures for the perspective distorted pages. The detection method uses both edge features and text region detection to determine page boundaries and the gutter. The page curves are then identified using filtering and grouping technique with a heuristic selection routine that weighs the contour completeness, curvature, and the fit to a smooth curve. Based on these criteria, top and bottom curves for each page are chosen to mark the extent of the page.

The top and bottom curves are then sent through a multi-scale curve refinement to better match the true curves. The multi-scale technique uses a Laplacian of Gaussian edge gradient at a larger image resolution to better localize the page contour edge using sub-pixel localization technique. The search for the edge is guided by the vertical vanishing point.

After curve refinement, a piecewise Bezier curve is fit to the points to smooth the data and provide a curve description better suited for user manipulation. In one aspect, only two Bezier segments are used to describe the data. In experiments it has been shown that fitting piecewise Bezier curves better models the data and the shape of the true curve using simple least-squares fitting routine and a C1 continuity post process.

From the curves describing the extent and outline of the page, a ruled mesh is generated that can be used in interactive feedback routines or for the page flatting routines. An adaptive method to change the quantization of the piecewise planar approximation in areas of high surface warp is also presented. The adaption is derived from a polygonal simplification of the bounding curves. During the mesh generation process the curves are checked to trim any regions that exceed the page boundary.

The ruled mesh can also be used to flatten images of warped documents, but the process may need to consider the inferred 3D geometry in order to produce corrections with consistent content scales across the page. In order to infer this geometry, the camera focal length is estimated from the polygonal simplification of the page curves. The disclosed method includes several heuristic methods to handle numerical stability that can arise with preferred methods to handle the uncertainty and still provide acceptable results. Next, the warped page surface normal is estimated for a piecewise planar approximation. Then, the ruled mesh is intersected with the piecewise planes to produce a 3D model of the document surface (to a scale factor). Finally, the target mesh of the flatten page is estimated from the 3D model, and used in conjunction with the ruled mesh to map data from the input image to the flatten image. The result is high quality image corrections of warped document images (curl, skew, perspective) to flatten images as if they were scanned from a conventional flatbed scanner.

Accordingly, a method is provided for the correction of a warped page image. The method first accepts a camera image of a page, creates a filtered edge map, and identifies text-likely regions. The filtered edge map and text-likely regions are projected into a polar coordinate system to determine page lines and warped image page curves. In one aspect, a multi-scale edge localization refinement is performed for each page curve. In another aspect, the method independently fits a pair of warped image page curve sections to a corresponding pair of Bezier curves. In yet another aspect, an edge map is histogrammed into theta bins. Minimum and maximum theta angles are computed for text-likely regions, a first page line is localized as the closest significant edge bin less than minimum text-likely region theta angle, and a second page line is localized as the closest significant edge bin greater than maximum test-likely region theta angle. Thus, page gutters can be identified for images of adjacent pages, where the gutter is determined as the closest significant theta edge bin to the theta angle halfway between the minimum text-likely region theta angle and the maximum text-likely region angle.

Then, an adaptive two-dimensional (2D) ruled mesh piecewise planar approximation of a warped page surface is created. In one aspect, the adaptive 2D ruled mesh of the warped page surface is used to estimate the camera focal length. The method is able to create a three-dimensional (3D) model using the adaptive 2D ruled mesh and the estimate of the camera focal length estimate. If the adaptive 2D ruled mesh includes a plurality of planar strips, a camera focal length can be estimated for each planar strip. Using the 3D model, a 2D target mesh is created for rectifying the image of the page. In one aspect, the adaptive 2D ruled mesh is projected onto a 3D warped page surface using the estimated camera focal length and an estimated surface normal of each planar strip from the adaptive 2D ruled mesh.

Additional details of the above-described method and a system for the correction of a warped page image are provided below.

BRIEF DESCRIPTION OF THE DRAWINGS

FIG. 5 depicts a 1D histogram and associated image of two adjacent pages.

FIG. 6 is a diagram depicting an image of adjacent pages with the identification of top and bottom page curves.

FIG. 7 is a diagram depicting an adaptive 2D ruled mesh divided into planar strips.

FIG. 15 illustrates an exemplary workflow process for the analysis of edge regions to determine the gutter between facing pages.

FIG. 16 illustrates an exemplary workflow process to identify or generate the page curves that span between the page boundary lines.

FIG. 18 illustrates a workflow process for multi-scale page curve refinement.

FIGS. 22A and 22B are a flowchart illustrating a method for the correction of a warped page image.

DETAILED DESCRIPTION

The parent applications mentioned above in the Related Applications Section include a description of low-level features, filtering, and contour selection processes. In this disclosure, the terms "contours" and "curves" are used interchangeably.

Figure 1:
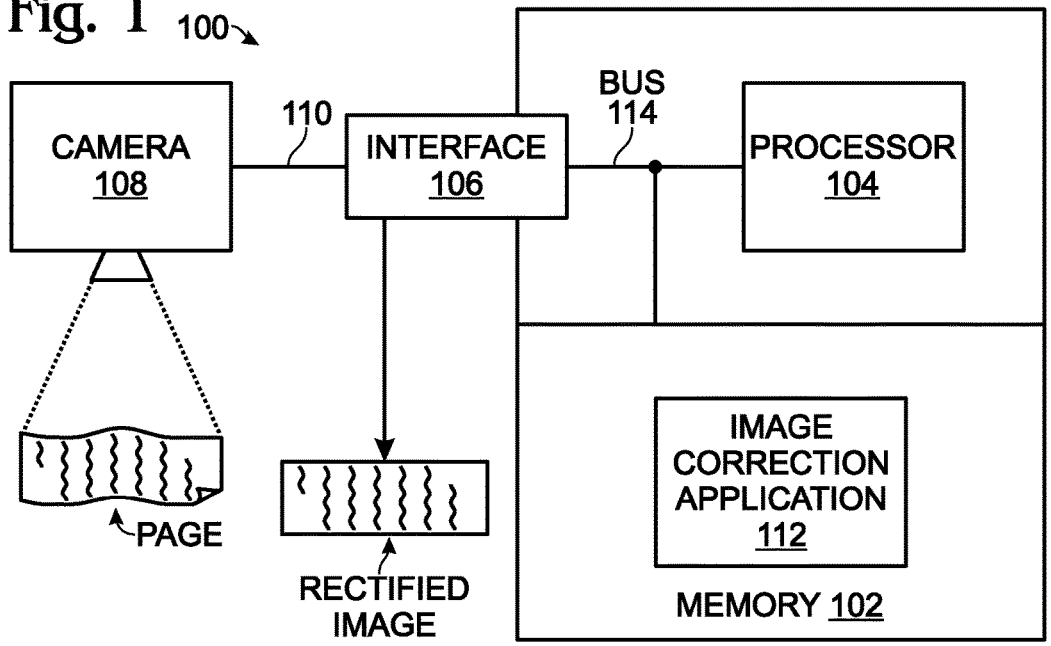
FIG. 1 is a schematic block diagram of a system for the correction of a warped page image.

FIG. 1 is a schematic block diagram of a system for the correction of a warped page image. The system 100 comprises a non-transitory memory 102, a processor 104, and an interface 106 to accept a camera image of a page, and to supply a rectified image of the page. As shown, interface 106 is connected to camera 108 via line 110. An image correction application 112 is stored in the memory 102 and enabled as a sequence of processor executable steps for performing the following steps:

1) creating a filtered edge map and identifying text-likely regions;

2) projecting the filtered edge map and text-likely regions into a polar coordinate system to determine page lines and warped image page curves;

3) creating an adaptive two-dimensional (2D) ruled mesh piecewise planar approximation of a warped page surface;

4) estimating a camera focal length;

5) creating a three-dimensional (3D) model using the adaptive 2D ruled mesh and camera focal length estimate; and, 6) using the 3D model, creating a 2D target mesh rectifying the image of the page.

The system 100 described above may employ a computer system with a bus 114 or other communication mechanism for communicating information between the processor 104, memory 102, and interface 106. The memory 102 may include a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause the processor 104 to perform some or all of the steps associated with image correction. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read. As such, the image correction application may permanently stored in a computer-readable medium.

In one aspect, the above-described system is enabled as a handheld device, such as a smartphone. Other examples of a handheld device include a calculator, personal digital assistant (PDA), cell phone, tablet, or notebook computer. The interface 106 may be more than one interface, some examples of which include a modem, an Ethernet card, a computer bus protocol, which may include a back-side bus or peripheral component interconnect (PCI) for example, or any other appropriate data communications device such as USB. The physical communication links may be optical, wired, or wireless.

Figure 2:
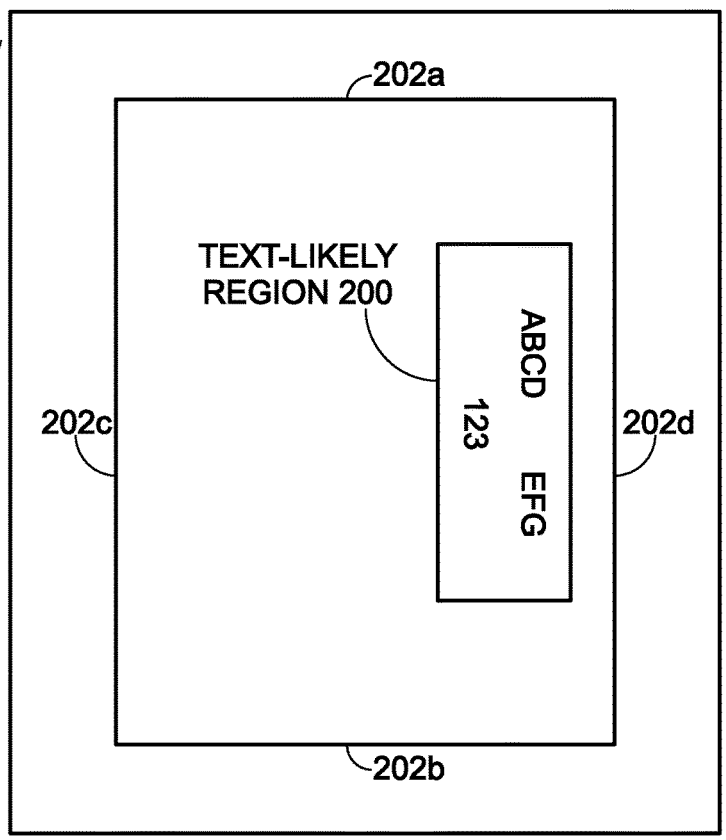
FIG. 2 is a diagram depicting the step of creating a filtered edge map and identifying text-likely regions (Step 1).

FIG. 2 is a diagram depicting the step of creating a filtered edge map and identifying text-likely regions (Step 1). Shown are a single text-likely region 200 and edges 202a, 202b, 202c, and 202d.

In one aspect, subsequent to projecting the filtered edge map (e.g., edges 202a, 202b, 202c, and 202d) and text-likely regions (e.g., 200) into the polar coordinate system (Step 2), the image correction application performs a multi-scale edge localization refinement for each page curve. In turn, the image correction application performs the multi-scale refinement of the page curves through the following sub-steps:

transforming top and bottom page curves into point sets having a first resolution;

scaling the point sets to a second resolution, lower than the first resolution;

creating a gradient image of the second resolution point sets;

identifying zero crossings points in the gradient image as a page edge; and, scaling the zero crossing points to the first resolution.

Figure 3:
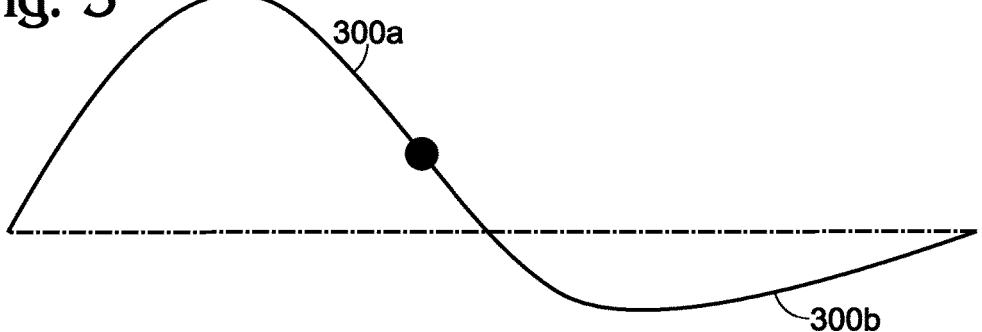
FIG. 3 is a diagram depicting a pair of Bezier curves.

FIG. 3 is a diagram depicting a pair of Bezier curves. In one aspect, subsequent to Step 2), the image correction application independently fits a pair of warped image page curve sections to a corresponding pair of Bezier curves 300a and 300b.

Figure 4:
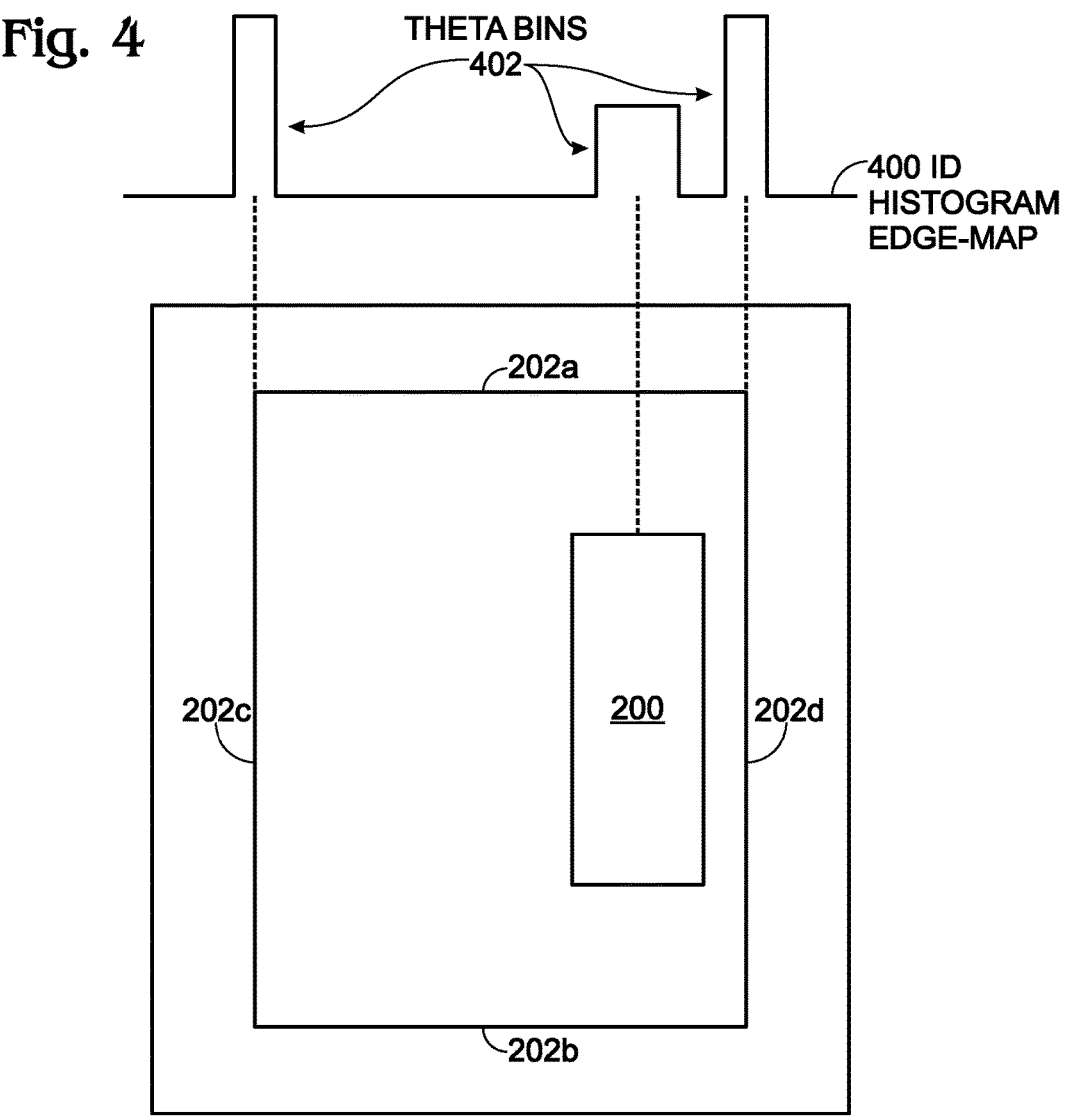
FIG. 4 is a one-dimensional (1D) histogram of the page image presented in FIG. 2.

FIG. 4 is a one-dimensional (1D) histogram of the page image presented in FIG. 2. In one aspect subsequent to Step 2), the image correction application histograms an edge map 400 into theta bins 402, computes minimum and maximum theta angles for text-likely regions 200, and localizes a first page line 202c as the closest significant edge bin less than minimum text-likely region theta angle and a second page line 202d as the closest significant edge bin greater than maximum test-likely region theta angle.

FIG. 5 depicts a 1D histogram and associated image of two adjacent pages. In this aspect the image correction application is able to identify page gutters for images of adjacent pages. The gutter 500 is determined as the closest significant theta edge bin 502 to the theta angle halfway between the minimum text-likely region theta angle 504 and the maximum text-likely region angle 506.

FIG. 6 is a diagram depicting an image of adjacent pages with the identification of top and bottom page curves. In this aspect the image correction application filters curves not between page boundary lines, and divides remaining curves into a top set defined by curves 600 that are within the region defined by boundary lines L1, L2, and LC1. A bottom set is defined by curves 602 that are within the region defined by the boundary lines L1, L2, and LC2, where L1 is a left boundary, L2 is a right boundary, and LC2 is a bottom boundary. The image correction application selects the top page curve as a top set curve 600 with highest completeness and lowest curvature between the boundary lines L1 and L2, and selects the bottom page curve 602 as bottom set curve with the highest completeness and lowest curvature between the boundary lines L1 and L2. For an image of adjacent pages, the result is that each page is divided into upper and lower curve sets 600 and 602 using boundary lines L1 L2, LC1, LC2, and gutter 500, with upper and lower curve lines being favored that join at the gutter.

FIG. 7 is a diagram depicting an adaptive 2D ruled mesh divided into planar strips. In one aspect, the image correction application creates the adaptive 2D ruled mesh (Step 3) with a plurality of planar strips, as shown, and independently estimates a camera focal length for each planar strip. For example, one planar strip is defined between points T1, T2, B1, and B2.

Figure 8:
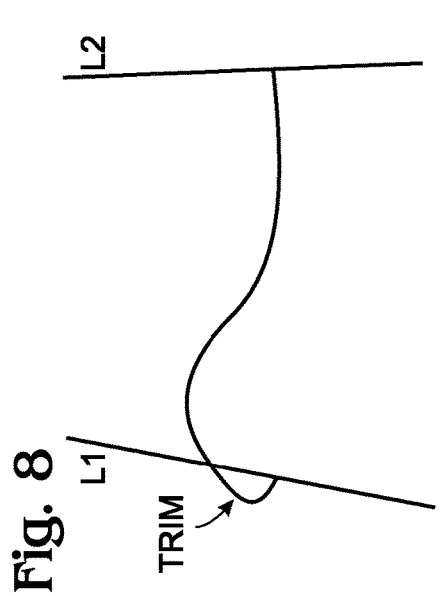
FIG. 8 is a diagram of the page of FIG. 7 with a polygonal approximation of the Bezier curves.

FIG. 8 is a diagram of the page of FIG. 7 with a polygonal approximation of the Bezier curves. In this aspect the image correction application modifies the adaptive 2D ruled mesh using a polygonal approximation of the Bezier curves and polygonal simplification, with a fit tolerance (fitTH) of 0.5 pixels. In another aspect, the image correction application estimates the camera focal length (Step 4) using the adaptive 2D ruled mesh of the warped page surface, details of which are provided below.

Figure 9:
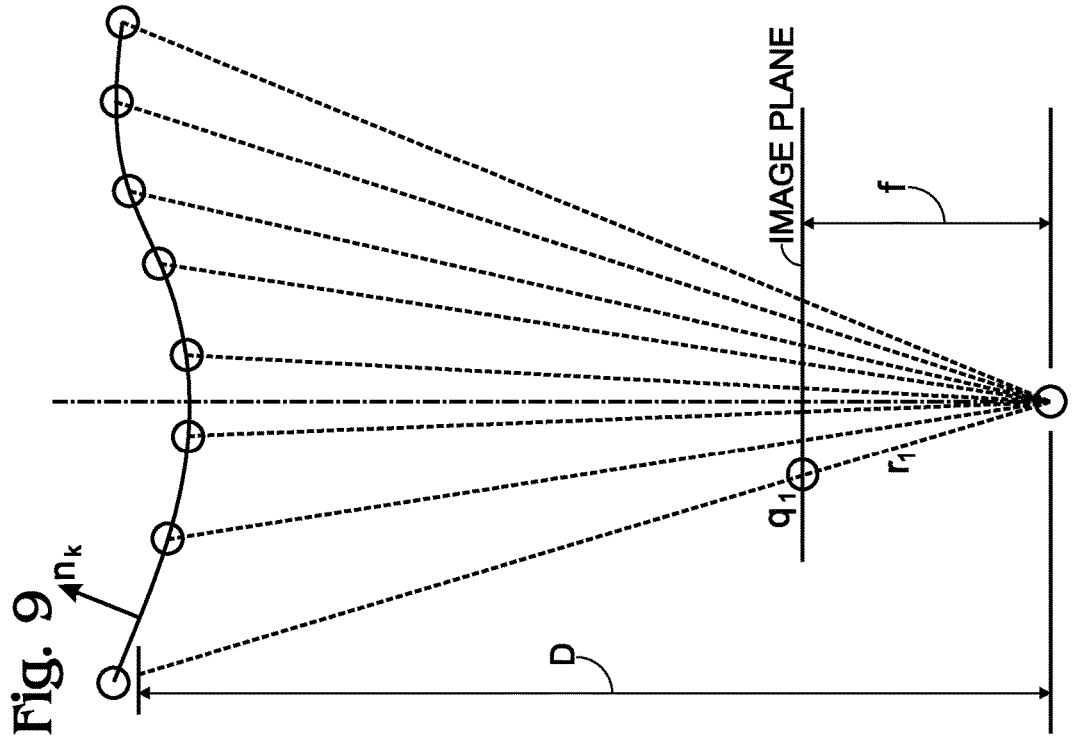
FIG. 9 depicts the construction of a warped document surface.

FIG. 9 depicts the construction of a warped document surface. In Step 5 the image correction application creates the 3D model by projecting the adaptive 2D ruled mesh onto a 3D warped page surface using the estimated camera focal length and an estimated surface normal of each planar strip from the adaptive 2D ruled mesh. The image correction application creates the 2D target mesh by determining the resolution of a 2D target mesh, in response to scaling 3D mesh width and height values, where the scale factor is determined by measuring an overall 3D page width and height and an input region width and height. The image of the page is rectified (Step 6) using a perspective dewarp to interpolate image values from the adaptive 2D ruled mesh into the image defined by the 2D target rectilinear mesh, as explained in more detail below.

Detect Single Page Boundaries

Figure 10:
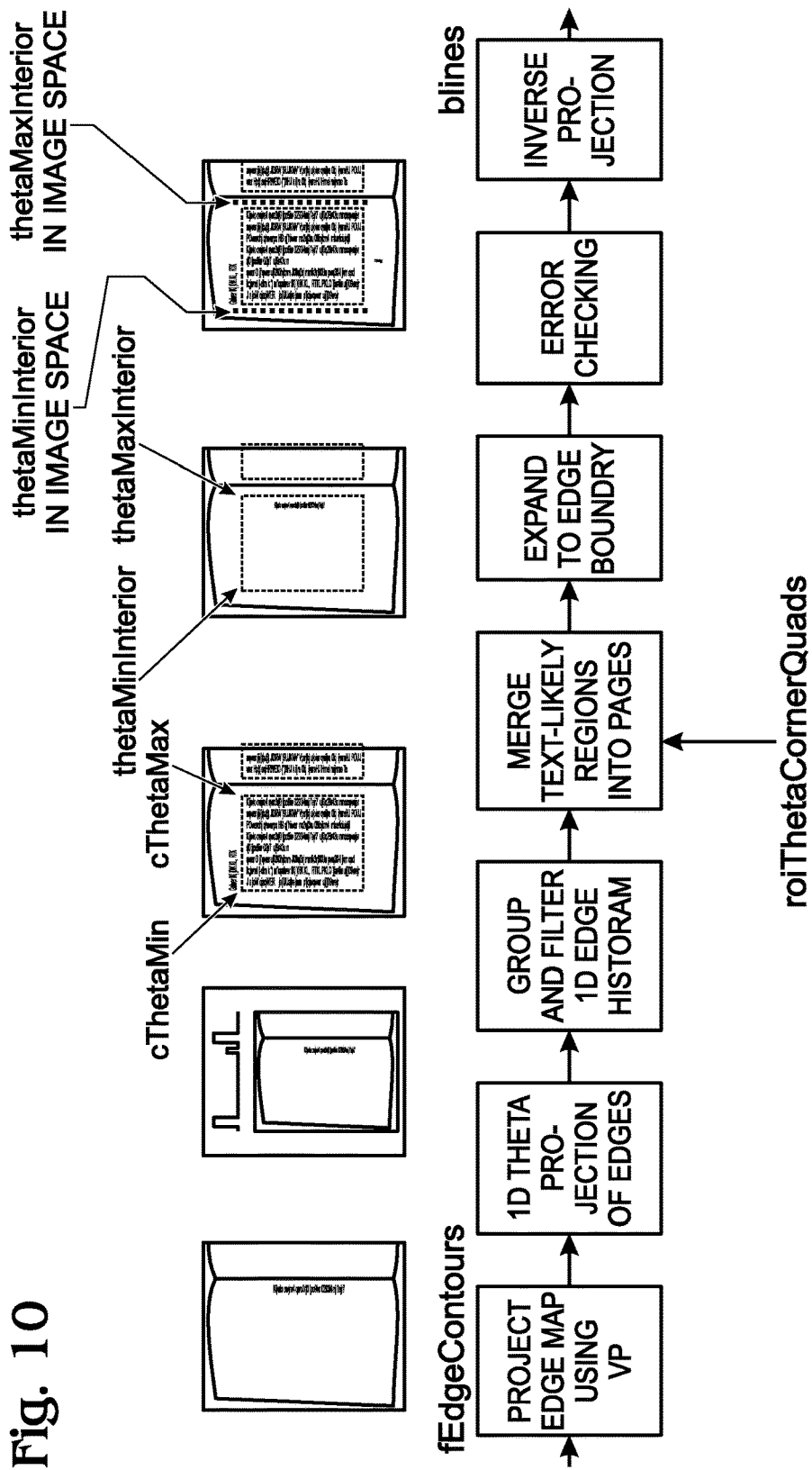
FIG. 10 illustrates an exemplary process workflow for detecting the page boundaries lines of a single visible page.

FIG. 10 illustrates an exemplary process workflow for detecting the page boundaries lines of a single visible page. The process parses the data from both the page-of-interest and the partial visible page to determine the page boundaries of the page-of-interest. The method first projects the filtered edge map, calculated at the smallest scale using filtering techniques described in the parent applications, to a polar coordinate system using the vanishing point. The projection removes skew and perspective distortion and parallelizes the page and gutter lines.

Figure 11:
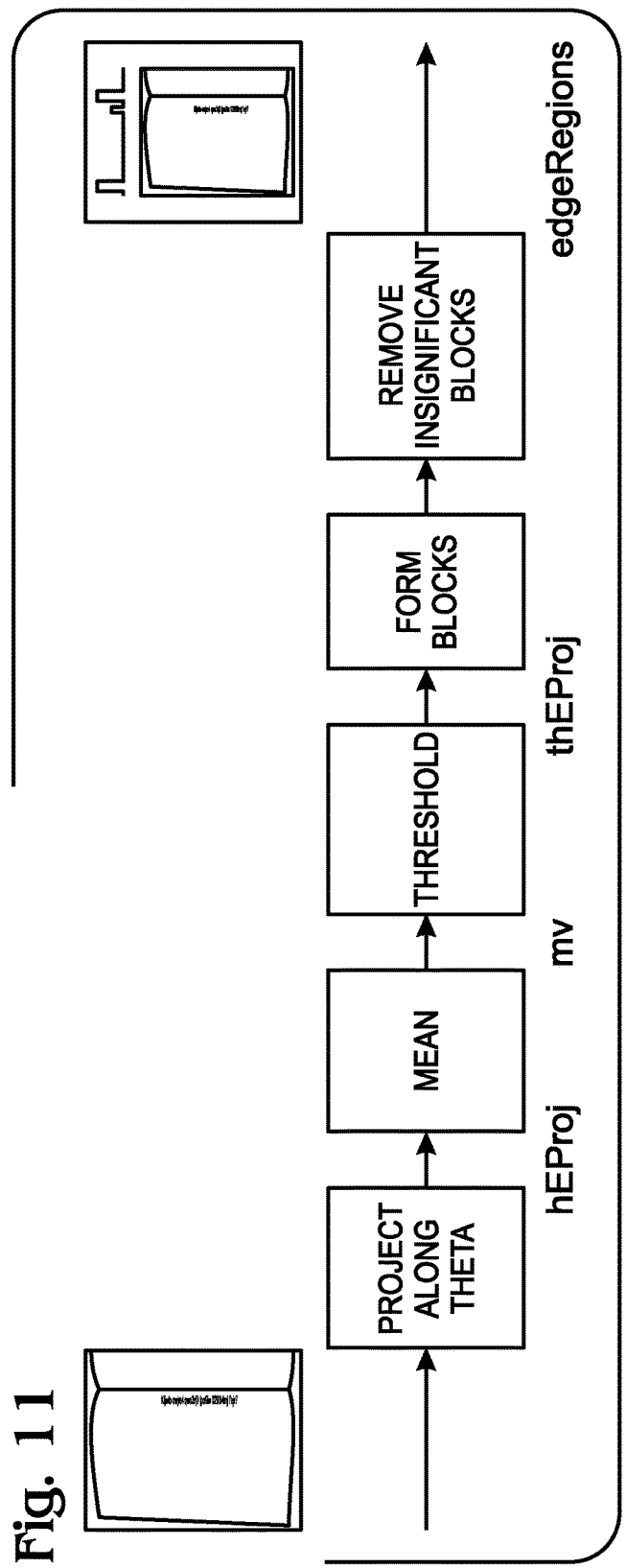
FIG. 11 illustrates an exemplary process workflow for the edge analysis of a polar projection to determine significant edge regions.

FIG. 11 illustrates an exemplary process workflow for the edge analysis of a polar projection to determine significant edge regions. The rectified edges are then projected along the columns to generate a 1D histogram of edge occurrence (hEProj). The mean value of the histogram mv is then used to threshold the histogram bins as a first order significance measure of edge overlap. The bins above threshold are then aggregated into connected blocks of significant edge regions and the percentage of edge pixels being projected onto the edge region are calculated for each region. Finally, edge regions with less than a minimum threshold (e.g., 2%) of the edges that passed the first significant threshold are removed as noise regions. The surviving edge regions often denote projections of edge pixels that correspond to page and gutter lines, but could also denote significant vertical content edges at the boundaries of local page backgrounds or for large graphics.

Figure 12:
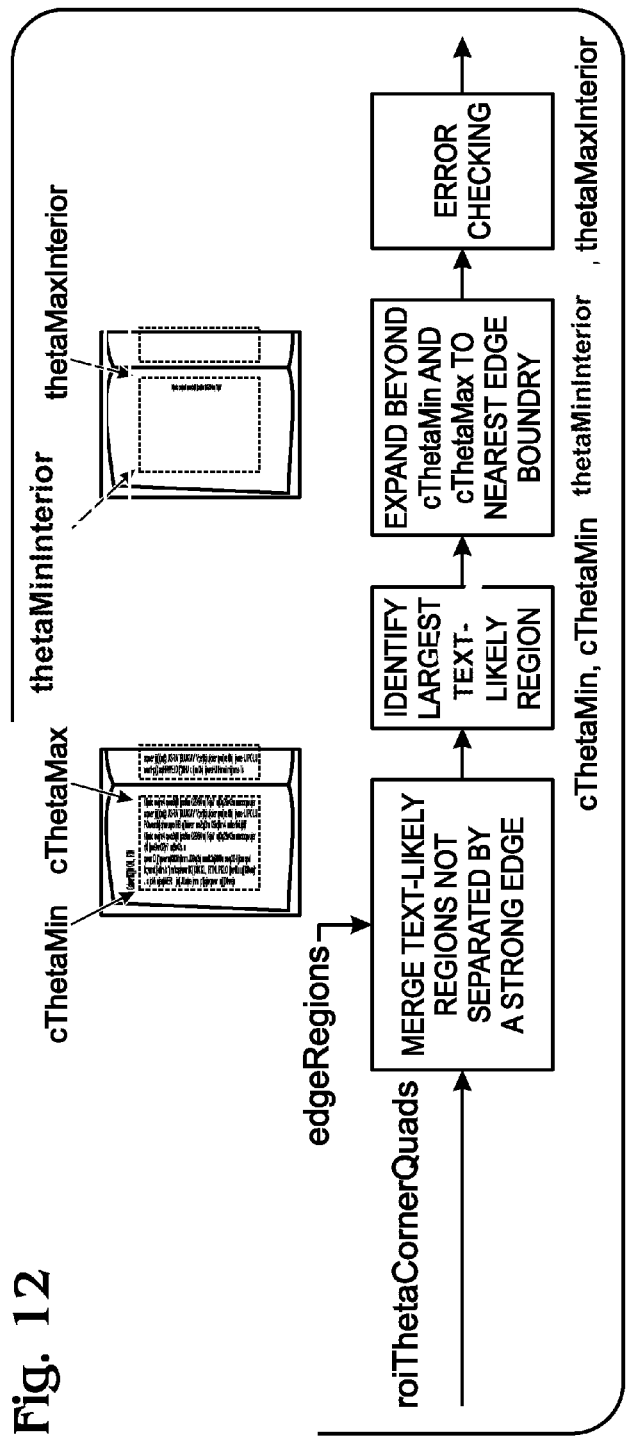
FIG. 12 illustrates an exemplary workflow process for the analysis of edge regions and text regions to determine page boundaries.

FIG. 12 illustrates an exemplary workflow process for the analysis of edge regions and text regions to determine page boundaries. To help resolve the ambiguity between significant content edges and boundary edges, the text region detection results, as described in the above-referenced parent applications, are used to seed the selection of page edge boundaries. The text-likely regions denoted by rectangles roiThetaCornerQuads, computed using the methods described in the above-referenced parent applications, represent regions within the image that contain strong text signatures. These regions are first analyzed to determine the region of text that likely marks the text of the page-of-interest. For multi-column pages the text on a page can be broken into multiple regions. The area between each text region is analyzed to determine if a significant edge exist. A strong edge signature is a cue that area between text regions is the gutter between two facing pages. After the merge, the largest text likely region is initially chosen as a seed for the page-of-interest. The extent of the seed region is denoted by (cThetaMin, cThetaMax). The seed often marks the content boundary of the page. To identify the page boundaries the seed is expanded to the nearest significant edge region in edgeRegions. These boundaries are labeled (thetaMinInterior, thetaMaxInterior). Because edge regions can become large for thick books, where the end of the underlying occluded pages are visible and can produce significant edge content, the start of the edge regions are used to mark the boundary. In some cases, no edge region is identified before reaching the limits of the data. This can happen if the content boundary (cThetaMin, cThetaMax) encroaches on the edge regions because the whitespace between pages is small or because of linear structures near page boundaries. An error checking procedure identifies cases when the search exceeds data boundaries. The procedure then walks back into the data to identify the nearest edge region to the data boundary. If the new region identified by the newly identify edge (newThetaMinInterior, thetaMaxInterior) or (thetaMinInterior, newThetaMaxInterior) is still large (as defined by a percentage change in region size), then this region is used. The result is then projected back into original (x,y) image space and processed using one or more of the process workflows shown in FIG. 10.

Figure 13:
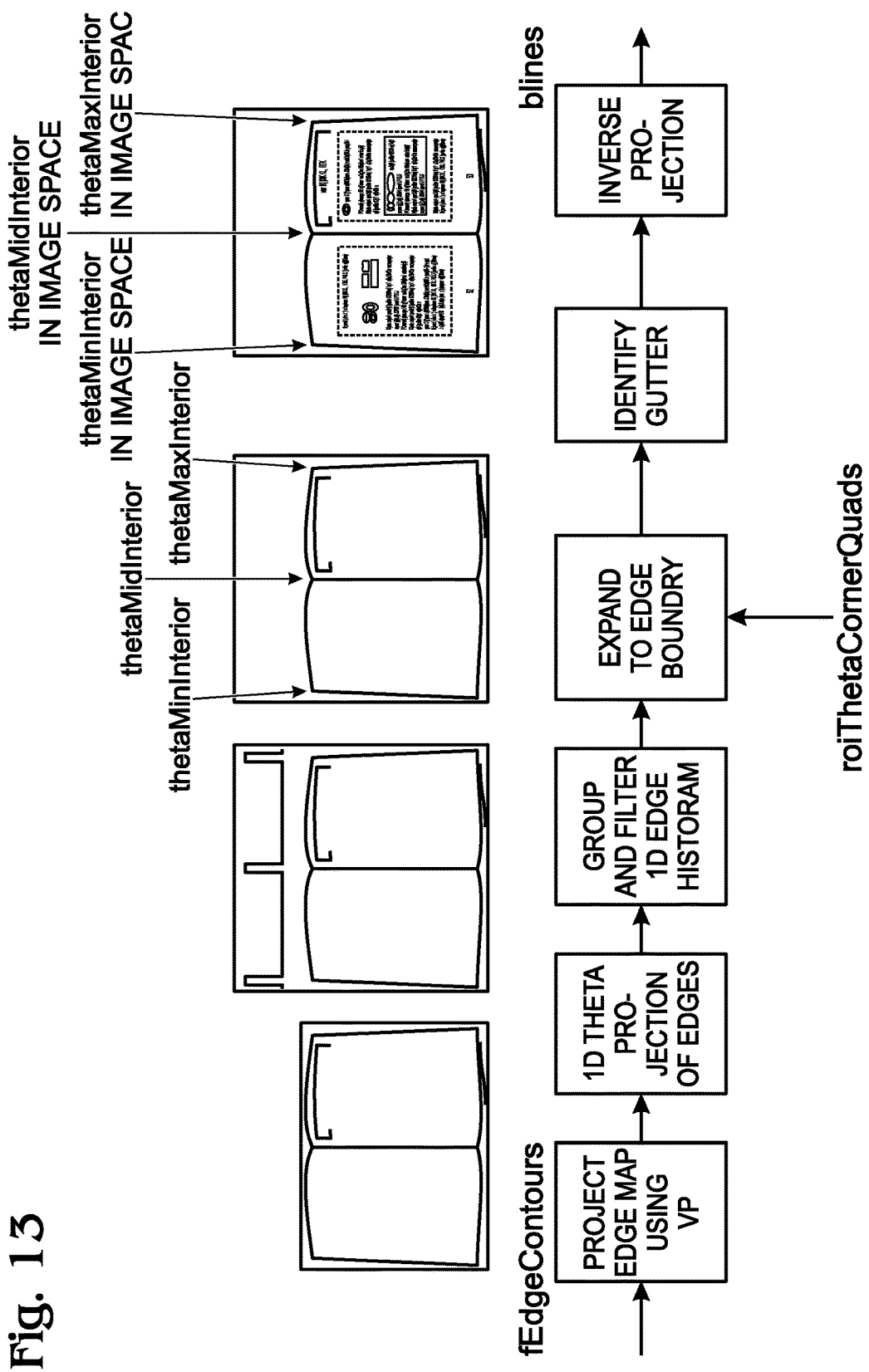
FIG. 13 illustrates an exemplary workflow process to determine page boundaries and gutter for two facing pages.

FIG. 13 illustrates an exemplary workflow process to determine page boundaries and gutter for two facing pages. The patterns to detect page boundaries for two opposing pages are different than single page boundaries, but share some similarities. The method first projects the filtered edge map, calculated at the smallest scale using filtering techniques described in the above-referenced parent applications, to a polar coordinate system using the vanishing point. The projection removes skew and perspective distortion and parallelizes the page and gutter lines.

Figure 14:
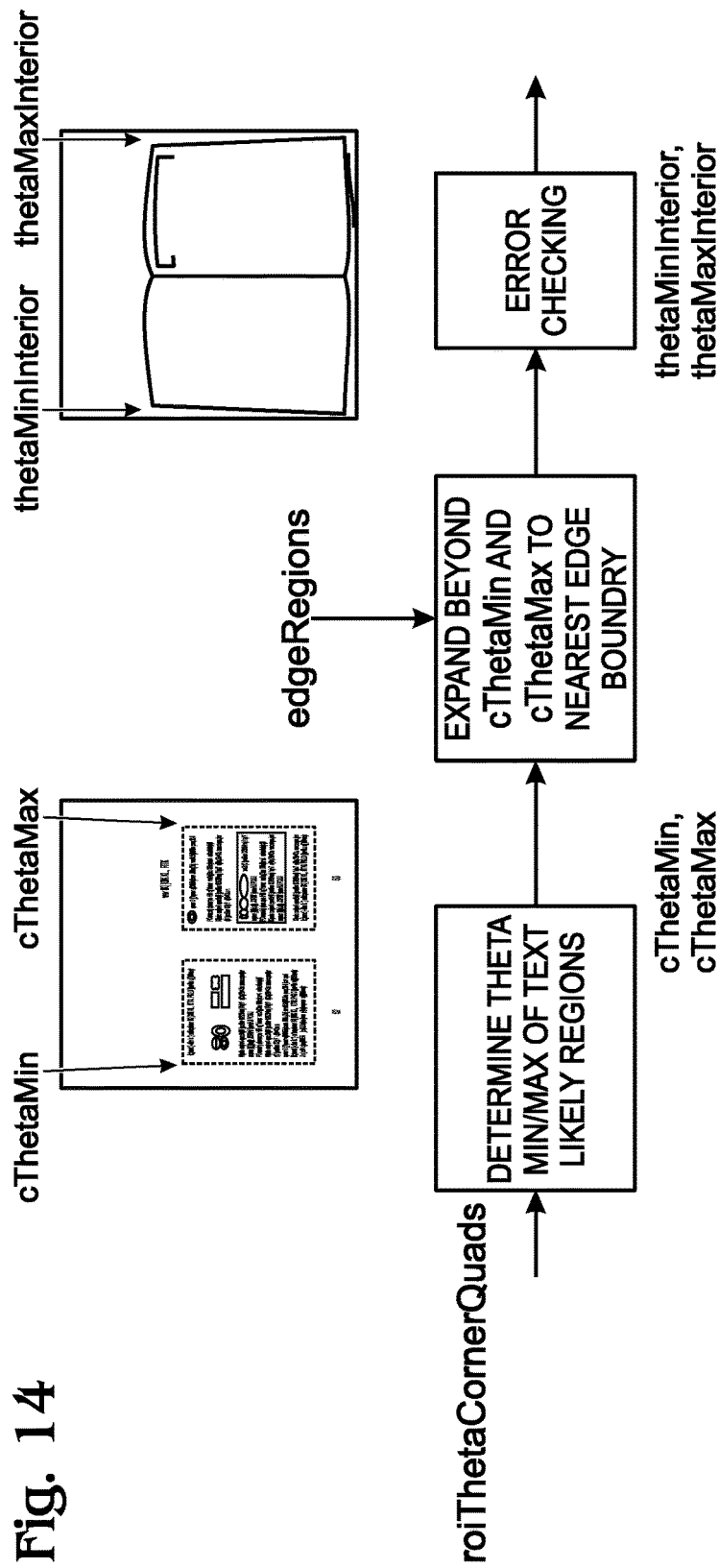
FIG. 14 illustrates an exemplary workflow process for the analysis of edge regions and text regions to determine the page boundaries for facing pages.

FIG. 14 illustrates an exemplary workflow process for the analysis of edge regions and text regions to determine the page boundaries for facing pages. Using the same techniques as the single page boundary algorithm, the rectified edges are then projected along the columns to generate a 1D histogram of edge occurrence (hEProj). The mean value of the histogram mv is then used to threshold the histogram bins as a first order significance measure of edge overlap. The bins above threshold are then aggregated into connected blocks of significant edge regions and the percentage of edge pixels being projected onto the edge region is calculated for each region. Finally, edge regions with less than a minimum (e.g., 2%) of the edges that passed the first significant threshold are removed as noise regions. The surviving edge regions often denote projections of edge pixels that correspond to page and gutter lines, but could also denote significant vertical content edges at the boundaries of local page backgrounds or for large graphics.

To help resolve the ambiguity between significant content edges and boundary edges, the text region detection results described in the above-referenced parent applications are used to seed the selection of page edge boundaries. The text-likely regions denoted by rectangles roiThetaCornerQuads, computed using methods described in the above-referenced parent applications, represent regions within the image that contain strong text signatures. The extent of these regions are determined and then grown to identify the nearest edge boundary. In some cases, no edge region is identified before reaching the limits of the data. This can happen if the content boundary (cThetaMin, cThetaMax) encroaches on the edge regions because the whitespace between pages is small or because of linear structures near page boundaries. An error checking procedure identifies cases when the search exceeds data boundaries. The procedure then walks back into the data to identify the nearest edge region to the data boundary. If the new region identified by the newly identify edge (newThetaMinInterior, thetaMaxInterior) or (thetaMinInterior, newThetaMaxInterior) is still large (as defined by a percentage change in region size) then this region is used.

FIG. 15 illustrates an exemplary workflow process for the analysis of edge regions to determine the gutter between facing pages. Finally, gutter between the facing pages is identified by first seeding the search with the midpoint between (thetaMinInterior, thetaMaxInterior). The closest edge block to the center prior is identified. Then the center of the edge block is checked to insure that it does not vary too much from the center prior. If $$\left(\frac{thetaMidInterior - thetaMinInterior}{thetaMaxInterior - thetaMinInterior}\right)$$

is within 0.4 to 0.6, for example, then the identified gutter is retained. Otherwise, the center prior is used. The result is then projected back into original (x,y) image space using one or more of the process workflows shown in FIG. 13.

Identify Page Curves

FIG. 16 illustrates an exemplary workflow process to identify or generate the page curves that span between the page boundary lines. The next step is to identify the top and bottom page curves that span between the boundary lines for each page. The process groups the curves into top and bottom candidates based on relationships to the content boundaries, then caches the boundary intersection state for each curve. The grouped curves then are parsed to identify the best path for top and bottom curve. Finally, a point set is generated for each curve.

The top and bottom page curves can be split up into multiple edge contours by the edge detection method or when noise or low background contrast exists. This, along with shadow or content contours near the true page contour, complicates the identification of the page curves from edge data.

The first process trims the input set of contours to only contain segments that exist between the boundary lines and lie within top and bottom curve regions. The top and bottom nomenclature is a convenient labeling of the opposing curve sets that match the illustrations and human norms for book bound content, but does not need to match the image capture conditions. In one aspect, the opposing sets general directionality is known to be left/right or top/down. This is done by conforming to capture norms of bound count for single and opposing page captures to fill the frame with the content of interest and utilize the best orientation of the camera to have the content fill the frame. This can be reinforced with user training on how best to capture content. Alternatively, the user can directly cue the readable orientation of the page through touch or menu/buttons. Alternatively, the method can automatically determine how best to capture content by examining the linear/curved structures and/or text font orientation for text that can be recognized.

The boundary lines bLines (see FIG. 17B) are encoded to reconstruct both the implicit form as well as the extent of the content boundary. The content boundary is calculated from the text detection regions, as defined in the above-referenced parent applications, and illustrated by boxes formed by the boxes 1500 and 1502 of FIG. 15. The top and bottom of the boxes define the content boundary. For some page content the text boundary is close to the page curves which can result in the page curve being clipped by the linear estimate of the content boundary.

Figure 17B:
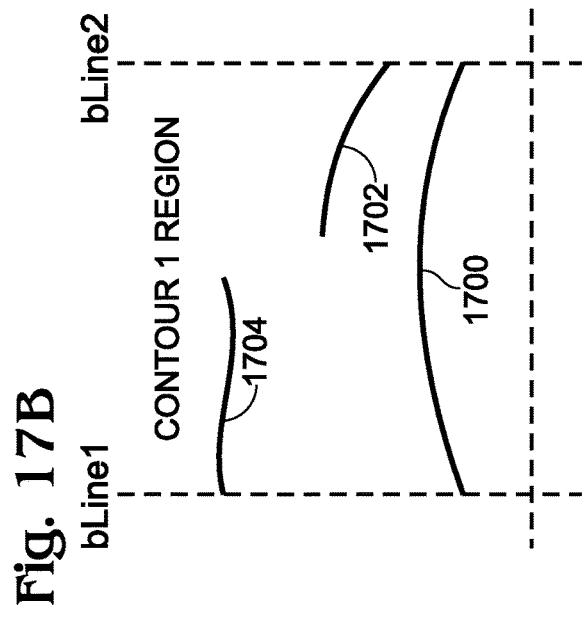
FIGS. 17A and 17B illustrate how the page curves may be labeled into sets.
Figure 17A:
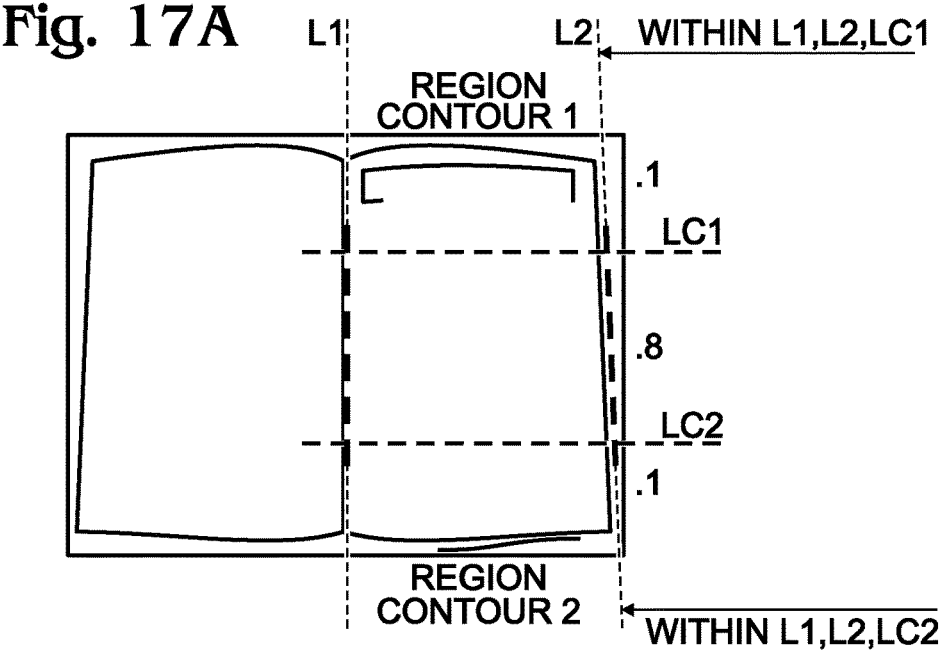

FIGS. 17A and 17B illustrate how the page curves may be labeled into sets. In FIG. 17A the boundary lines L1, L2 are illustrated both with the long thin vertical lines and the thicker shorter horizontal lines. The extent of the shorter lines illustrates the marking of the content boundary by text region detection. The extent is defined by points p0, p1 on L1 and the points p2, p3 on L2. Then, the line LC1 is defined by the points $ptLC1\_0=0.9*p0+0.1*p1$ and $ptLC1\_2=0.9*p2+0.1*p3$ as a weighted average of the content boundary points, where p0, p2 are closest to top and p1, p3 are closest to bottom. Likewise, the line LC2 is defined by the points $ptLC2\_0=0.9*p1+0.1*p0$ and $ptLC2\_2=0.9*p3+0.1*p2$ as a weighted average of the content boundary points. The lines LC1 and LC2 are illustrated in FIG. 17A. Alternatively stated, the filtered contours are trimmed and divided into sets for curves likely to be top or bottom page curves. The top region is defined by boundary lines L1, L2 and content boundary LC1. While the bottom region is defined by boundary lines L1, L2 and content boundary LC2.

FIG. 17B illustrates the labeling the curves into sets. The first line 1700 labels the curves that span between the boundary lines, the second line 1702 labels curves that only intersect the first boundary (right), and the last line 1704 labels curves that only intersect the second boundary (left).

The lines L1, L2, LC1 (FIG. 17A) define a region where the application trims and labels the contours within this region as candidates for the top page curve. The contours fEdgeContours are tested to see if the polyline segments making up the contours lie within the region or intersect the boundary. The contours that intersect the region are trimmed to include only the portions of the contour that lie within the region. Because the segments representing the contour can vary in length, the trimming algorithm also detects when a segment intersects the region boundaries and computes the boundary intersection points to define a contour that includes the boundaries. This is repeated for the bottom curve region. The result is trimmed contour sets tContours1 (top) and tContours2 (bottom).

Additionally, the contours are marked with a complete label to indicate if the contour spans the space between L1, L2. This label is marked with reference designator 1700 in FIG. 17B. Likewise, if the curve only intersects L1 but not L2 then it is given leftlabel (1704) and if the curve only intersects L2 but not L1, then it is given rightlabel (1702). These labels define subsets in the possible page contours to assist in search and generation of the best path.

In one aspect, the contour selection process jointly estimates the best path using labeled data from both top and bottom sets as well as the facing page if those sets also exist. Top and bottom paths that join or nearly join at the gutter for the bound document are favored over alternatives that are more disjoint.

In a different aspect, the top and bottom paths for each page are considered separately. Contours that are complete are favored over partial paths between the boundary lines. If a complete path exists, then the path with the lowest curvature is selected as the best path. If no complete path exists, the partial sets right and left are searched for a nearly complete path where completeness is measured as the distance between boundary lines, minus the distance between the contour endpoint and boundary line normalized by the distance between the boundary lines. Paths that are nearly complete are close to the value of 1. In one example, nearly complete paths are "1" if they have a completeness greater than or equal to 0.95. If multiple nearly complete paths exist, then the best path is the one with the lowest curvature. If no path has been found, then composite paths are checked built from right and left pairs. The quality measure tests each pair if the combined completeness (left plus right) is above a partial completeness threshold (e.g., 0.5) to denote a composite curve that spans a significant portion of the space between the boundary lines and, if composite completeness is less than a max threshold (e.g., 1.05), to check if a pair overlaps indicating a completeness greater than one. Of the pairs that meet these two thresholds, a quality measure is calculated as a product of the residual Bezier curve fit (points in both left and right curves) and the mean curvature of the pair over the combined completeness. The quality measure rewards pairs that can be fit to a simple smooth curve and with low curvature, but penalizes curves with lower completeness scores or more complex shapes. The pair with the lowest quality measure is selected as the best composite path.

The curvatures of the contours are tested to differentiate shadow contours from the true alternative when multiple solutions exist. The shadow contours are often more highly curved than the true contour. Finally, the top and bottom paths are converted into point sets traversing from L1 to L2.

Multi-Scale Curve Refinement

For efficiency reasons the page boundary and curve are found at the smallest scale. Searching the smallest scale reduces the number of operations required to identify the boundary and minimizes the response from small structures, but results in a highly quantized representations of the page curves. When the curve points are rescaled to full resolution and used for correction, the result can have residual artifacts. To compensate for the small scale curve estimate a multi-scale refinement process is adopted. The result is a more accurate page curl correction with less residual artifacts while still maintaining computational efficiencies.

FIG. 18 illustrates a workflow process for multi-scale page curve refinement. The points from the top and bottom curves, calculated in the prior step, are transformed into point sets traversing from one boundary to the other. The polyline representation of the curves is traversed to produce point sets with interior points and not just the polyline endpoints. The result is an ordered point set that reproduce the edge map for curve. The point sets are labeled ptsC1Low and ptsC2Low, where C1 represents the top curve in the previously presented illustrations and C2 the bottom curve in the illustrations. The point set representations can have gaps if the edge map has gaps in the page curves due to noise or other factors. These gaps are filled by fitting the points to a curve after the multi-scale refinement.

The point sets ptsC1Low and ptsC2Low are integer point sets that match the small scale edge map. These point sets are scaled to the medium image scale, as described in the above-referenced parent applications, and stored as floating point values. The Laplacian of Gaussian (LoG) operator is applied to the medium scale luminance image imgLMed to produce a gradient image where the zero crossings represent edge locations. The LoG can be applied in multiple stages, or a Gaussian operator then Laplacian, or in one aspect the two kernels are convolved and only a single operator applied. Even though the refinement operation is done at the medium scale, the use of a sub-pixel edge location technique, such as finding the zero crossing, essentially produces a higher resolution estimate than the medium resolution image would initially indicate. In practice, this approach produces a noticeable improvement in the correction quality using the refined curve estimates.

Recall that LoG operator results in a positive and negative response to an edge as the operator iterates across an edge. The refinement technique uses the original estimate and the vanishing point intersected by page boundary and gutter to define a search region for both the positive and negative LoG response. If both the positive and negative response is found, then a simple linear interpolation between them is used to identify the zero crossing for sub-pixel accuracy of edge localization. If the search does not identify both the positive and negative responses, then original low resolution estimate is used.

In the current embodiment the refinement process uses a local search process to identify the positive and negative edge responses for each point. A search process is used because the refinement is run on skewed and warped data where the curves may not be aligned with the cardinal directions. For each point pt(k) in ptsMC1 and ptsMC2 a region $\Re = \{i=-nS+pt(k).y, \ldots, pt(k).y-nS, j=nS+pt(k).x, \ldots, pt(k).x-nS\}$ surrounding the point is searched using a neighborhood defined by the parameter nS, for example, nS=3. Then for a point pt(k) in the set of priors ptsMC1 or ptsMC2, the rectangular region is searched to identify the location and value of the minimum and maximum weighted wLoG(i,j) response given pt(k), denoted as pt_minLoG, pt_maxLog and minWLoG,maxWLoG respectively, where wLoG(i,j) is defined as imgMLoG(i,j)/(1+dLine) and dLine is the distance between the point (i,j) and the line from pt(k) to the vanishing point. The weight penalizes pixels that are farther from the line connecting the prior point estimate and the vanishing point. Conversely, the measure favors large LoG values close to the vanishing line. If minWLoG<0 and maxWLoG>0 indicate that min max LoG values have been found in the region, then the zero crossing is calculated as a linear interpolation between the min and max locations and added as the new value in ptsMC1 or ptsMC2. Finally, the refined points are scaled to match the full image resolution or the resolution used in the correction routines to remove page warp, perspective distortion and skew.

Piecewise Bezier Curve Fit

In practice, it has been found that fitting a single Bezier curve to the points is insufficient to accurately model the shape of the true curve. For face-up camera scanning of bound content, the shape of the page typically conforms to a curve as illustrated in FIG. 3. The shape of this curve depends on the material properties of the page, binding type, and thickness of the book. In the prior art, often a cylindrical or exponential model is use to describe the shape of the page curve. These models are insufficient to describe the typical page curve for face-up document scanning. Note: a single Bezier curve can describe the curve shape of FIG. 3, but in practice the fitting routine does not accurately model the shape due to simple least squares distance minimization. Rather than modifying the fitting routine, it was found sufficient to fit a piecewise Bezier curve to data split at the inflection point.

Figure 19:
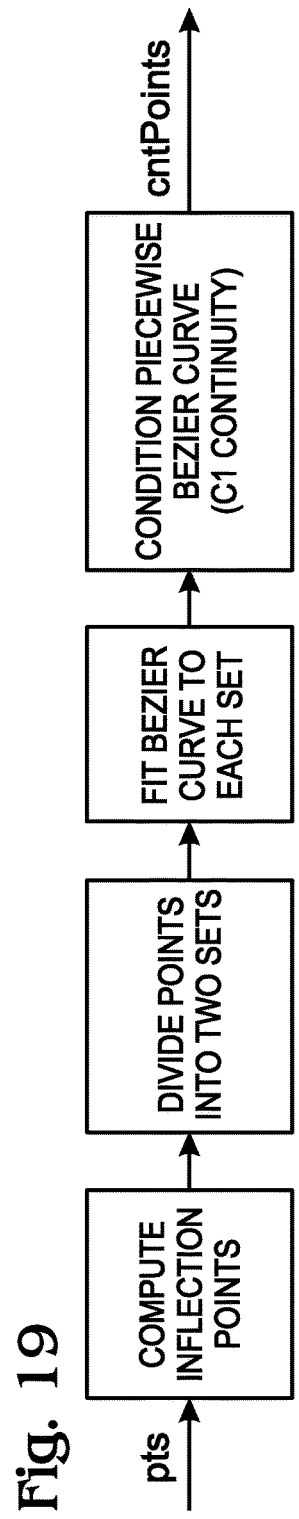
FIG. 19 illustrates a workflow process for piecewise Bezier curve fitting steps.

FIG. 19 illustrates a workflow process for piecewise Bezier curve fitting steps. The fitting routine first approximates curvature from the point set to compute the inflection points. If inflection points exist, then the inflection point closest to the midpoint between the curve end points is chosen as a split point for the piecewise Bezier curve. If no inflection point is found, then the curve point closest to the midpoint between the endpoints is chosen. Once the split point has been chosen two point sets are generated from the initial point set. The first represents the first half of the point set and the second the latter half. Both sets include the split point.

The point sets are then used to fit a Bezier curve. The fitting process is run independently for each set. Because the fitting process is run independently, the curve continuity at the split point is only C0, which can result in visual crease at the split point. A post processing routine is applied to the Bezier control points after fitting process to insure C1 continuity.

The result of the routine is a piecewise Bezier curve with 7 control points and C1 continuity. The fitting process is applied for both the top and bottom page curves and for each page. Denoting the curves as Ctop and Cbottom for facing pages, the curves are further denoted as Ctop1, Cbottom1 for left page and Ctop2, Cbottom2 for right page.

Adaptive Ruled Mesh from Piecewise Bezier Curves

Returning to FIG. 7, a ruled mesh decomposition is shown with top and bottom curves and the boundary lines L1 and L2. The description of the curves generates the ruled mesh decomposition of the warped page. The ruled mesh is piecewise planar approximation to the three dimensional page surface, projected into the image plane. The ruled mesh assumes that the three dimensional page is a developable surface (a surface that can be flattened onto a plane) where at any point on the surface only one of the principal curvatures is non-zero.

The curves marked as 700 and 702 respectively denote the top and bottom page curves. The end points of these curves intersect the page boundary lines L1, L2, which intersect at the page's vanishing point. The vertical ruled lines intersect the curves and also intersect the vanishing point illustrated by the dashed lines 704 through 722. Finally, the polygonal curves 724 through 738 are the straight line traces on the 3D surface that when distorted from page curl and projected fill in the mesh. The mesh illustrates the distortion of the flat page in the projected image and also illustrates the deviation from the desired flat page scan which would have produced a rectilinear grid.

The first step in generating the ruled mesh is to approximate the Bezier curves Ctop and Cbottom with a polygonal curve. The piecewise Bezier curves are first polygonized by generating points on the curve using as small delta T value to walk the curve representation. In one aspect, the value is 0.001. Then, the polygonal representation is simplified to reduce the number of points using OpenCV's implementation of Douglas Peucker polygon simplification algorithm. In one aspect, the fit epsilon is 0.5 pixels. The result is polygonal representation of each curve that approximates the curve with more points in areas of high curvature. These areas also correspond to areas of high curvature on the 3D surface for the page. The polygonal approximations approxCtop and approxCbottom to the curves are used to guide the adaptive subdivision of the surface where more planes are used in areas where the page contours are quickly changing, and less in other areas.

Returning to FIG. 8, in some cases the piecewise Bezier curve exceeds the region defined by the boundary lines L1, L2, as illustrated. This happens in most cases for documents with high gutter curvatures or for documents with shadows or noise near page contour. To compensate for this misestimation the curves are trimmed using the polygonal approximation by rejecting points on the polygonal approximation that lie outside of the region defined by the two boundary lines L1 and L2. The result is a trimmed curves approxCtopTrim and/or approxCbottomTrim, such as the one illustrated by the dashed line. If the curve has been trimmed, which is indicated by the shorter length (number of points), then it replaces the polygonal approximation approxCtop=approxCtopTrim if length (approxCtopTrim) <length(approxCtop) and approxCbottom=approxCbottomTrim if length(approxCbottomTrim)<length(approxCbottom).

An approximation with more points tends to indicate a curve with more curvature and is used in the algorithm to guide the vertical subdivision of the ruled Mesh.

If (length(approxCtop)>length(approxCbottom)), then approxCtop is used to subdivide the mesh. Otherwise, approxCbottom is used. The vertical subdivision (704 through 722 in FIG. 7) are created using the approximation and the vanishing point to create lines that intersect both the vanishing point and the points on the polygonal approximation picked in prior steps. In one aspect, the line is then intersected to the opposing curve using a line Bezier curve intersection function rather than intercepting the polygonal approximation. In one aspect line Bezier curve intersection method uses the same piecewise Bezier curves polygonization used earlier to initially generate a fine polygonized approximation of the curve before simplification, and then the intersection is selected as the point closest to the intersection line. In another aspect, the line is intersected with the polygonal approximation.

When the page's boundary lines L1 and L2 are nearly parallel, the calculations are modified to create the intersection lines using the point on the curve and the average direction of L1 and L2. This is done to improve numerical stability when vanishing point is ill-defined or becomes a vanishing direction.

Figure 20:
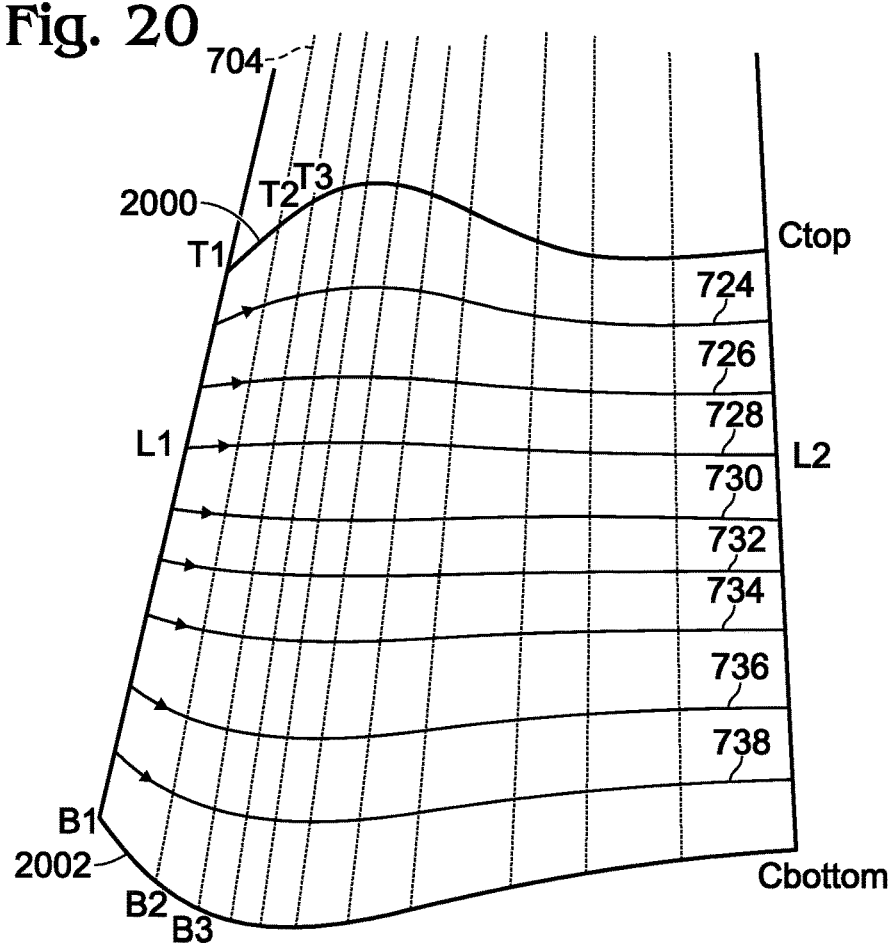
FIG. 20 illustrates a process for filling in horizontal components of the ruled mesh from L1 to L2.

FIG. 20 illustrates a process for filling in horizontal components of the ruled mesh from L1 to L2. Traces 724-738 are generated from L1 to L2, by first uniformly quantizing L1 between the two curves with equal line segments. In one aspect ten line segments are used. Then, the horizontal vanishing point for the first plane is calculated by using the lines defined by T1, T2 and the line defined by B1, B2 as illustrated. The intersection technique checks for ill-defined conditions which indicate that the lines are nearly parallel. When this is the case the vanishing point becomes a vanishing line whose direction is the average of the line directions. The lines 724-738 for the first plane defined by L1 and first line 704 are calculated by intersecting the line 704 with the lines defined by joint points of the quantized L1 line segments and the horizontal vanishing direction (as illustrated by the arrows). The process is repeated for each line pair starting with the horizontal line intersection points for the prior vertical line until L2 is reached.

Figure 21:
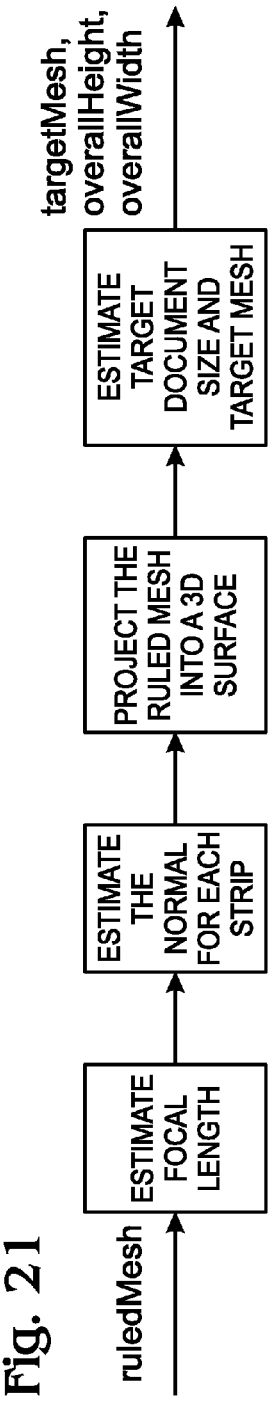
FIG. 21 illustrates a workflow process estimation of a warped 3D page from ruled mesh and a target mesh of the flatten page.

FIG. 21 illustrates a workflow process estimation of a warped 3D page from ruled mesh and a target mesh of the flatten page. The process estimates a correction to the image data that preserves relative heights and widths of content across the page. The process starts with a procedure to estimate the cameras focal length. Then, the surface normal is estimated for each planar strip in the ruled mesh. Following is an estimation of a 3D document surface using the 2D ruled mesh, focal length, and surface normal. Finally, the target mesh and target document size is estimated using the 3D warped document surface.

The process to estimate the camera focal length uses the planar strips defined by the ruled mesh to produce multiple estimates for the focal length. The normal estimated by the planar strips can have numerical stability issues because of the inaccuracy of the horizontal vanishing point estimated from the narrow planar strip. To compensate for the possible inaccuracy, the focal length is estimated for each planar strip. For each strip the horizontal line segments in the curve approximation, as illustrated respectively by the 2002 and 2002 in FIG. 20 between T1,T2 and B1,B2 for first strip, are checked to see if they are nearly parallel indicating that numerical stability issues will arise for vanishing point estimate. In one example, if the line directions are within 0.5 degrees, then the lines are considered parallel. In addition to the direction test, the calculated vanishing point is checked to insure all the values are finite. If the lines are nearly parallel or ill-conditioned, then the strip is ignored for estimating the focal length. However, if the horizontal vanishing point exits and vertical vanishing point and the dot product between the vanishing points is negative, then a focal length estimate is calculated and cached in a list of estimates. The vector form for calculating the focal length is used $f=(-(vpV \cdot vpH))^{1/2}$ where vpV and vpH correspond to vertical and horizontal vanishing points respectively. This is repeated for each planar strip in the ruled mesh. If the list of estimates is empty, then a default focal length is used. In one example, the default focal length is determined to be the focal length that matches a 60 degree horizontal field-of-view. In an alternative aspect, the default focal length can be the focal length determined from prior capture or the average focal length determined from prior estimations. If the focal length estimate list has valid entries, then the median value is chosen to be the focal length estimate. In an alternative aspect, the average focal length is used. Let fest denote the estimate focal length value in the analysis present below.

The normal for each strip is estimated next. For each strip k in the ruled mesh, the vector from the camera focal point to the vanishing points h=(vpH .x,vpH .y,fest) v=(vpV .x,vpV .y,fest) is generated. If the vanishing point exists, the same conditions mentioned in focal length estimate are used. Otherwise, the normal is assumed to be aligned with the optical axis ($n_k=(0,0,1)$). If h,v exist then the normal for the strip is defined as $n_k=\|h \times v\|$. The normal values are checked to insure they are finite. If for some reason they are ill-conditioned, then the default normal ($n_k=(0,0,1)$) is used for the strip.

Once each strips' normal is estimated, then the ruled mesh points for each strip is projected out into space to build 3D surface of the warped page. For unconstrained single view observations of unknown originals, the dimensions of the document are not known and can only be reconstructed up to a scale factor. Because of this, the method chooses an arbitrary scale value by enforcing that the first planar strip must contain the point P0=(0, 0, 10*fest), see FIG. 9. FIG. 9 depicts a 2D slice of the construction of the warped document surface, using the estimated focal length and slice normal, projecting out to a document surface that starts at D units from camera focal point. Then, the implicit form for the planar strip is $n_k \cdot pt+d_k=0$, where $n_k$ is the strip normal, pt=(x,y,z) is a point in the plane, and $d_k=-P0 \cdot n_k$ for k=0 to choose the left most strip. Once the strip's planar equation is defined, the ruled mesh points $q_{i,j}=(x_{i,j},y_{i,j})$ for the strip i=0, . . . Max(i) and j=0,1 are transformed into rays $r_{i,j}=(x_{i,j},y_{i,j},fest)$, which are then used to intersect the plane. The intersections compute the corresponding 3D mesh points $p_{i,j}$ on the 3D piecewise planar document surface.

Once the first strip j=0 has been intersected, the adjacent strip j=1 is computed by insuring the adjacent plane j=1 intersects all the 3D mesh points on the boundary pi,j=1 i=0, . . . ,Max(i) between the two planes. To do this a 3D point from prior intersection is picked from the boundary to fit the implicit form and insure that the new plane contains the boundary points from prior strip intersections with the 3D piecewise planar document surface. In one aspect, the implicit form for each strip is $n_j \cdot pt+d_1=0$, where $n_j$ is the j's strip normal, pt=(x,y,z) is a point in the plane, $d_j=p_{0,j} \cdot n_j$ for j=1 . . . Q, and Q=Max(j)−1 is the maximum index for the ruled mesh (the number of planar strips) minus one. Then, for each strip j, the ruled Mesh points $q_{i,j+1}=(x_{i,j+1},y_{i,j+1})$ are used to define rays $r_{i,j+1}=(x_{i,j+1},y_{i,j+1},fest)$ for i=0 . . . Max(i) and intersected the strip planar equation $n_j \cdot pt+d_j=0$ to produce the points $p_{i,j+1}$. This process continues until all the rays defined by the ruled mesh points have been intersected with the corresponding plane equation to produce MeshPoints3D MP={$p_{i,j}$|i=0, . . . , Max(i) and j=0, . . . , Max(j). The mesh is a piecewise planar approximation to the warped document surface that preserves relative width and height of the content.

Then, the width and height of each cell in MeshPoint3D is calculated by computing the length of the top $width_{i,j}=\|p_{i,j+1}-p_{i,j}\|$ and left sides $height_{i,j}=\|p_{i+1,j}-p_{i,j}\|$, i=0, . . . , Max(i)−1 and j=0, . . . , Max(j)−1. The width and height arrays will be used as a basis for the 2D target mesh for the flatten page.

Then, to determine the scale factor for the target mesh the $$overallheight = \sum_i height_{i,0} \text{ and } overallwidth = \sum_j width_{0,j}$$

of the arrays is computed.

In one aspect, the bounding box of the ruledMesh $q_{i,j}$ is computed to determine the extent of the bounding box inW=max($q_{i,j}$.x)−min($q_{i,j}$.x) and inH=max($q_{i,j}$.y)−min($q_{i,j}$.y), where x,y correspond to the x or y component of the point. Then the scale factor is $$scalef = \begin{cases} inW/overallwidth, & inW > inH \\ inH/overallheight, & \text{otherwise} \end{cases}.$$

In another aspect, inW and inH are determined jointly for the left and right pages. Being set as the same value insures both corrected pages will the same output resolution. In one aspect, inW and inH are determined jointly for all the pages scanned for a job to determine a fixed uniform output size for all the pages in a job.

Finally, the targetMesh is computed for the x values using the following form $t_{i,j}.x=\text{round}(scalef*width_{0,j})+t_{i,j-1}.x$ for i=0, . . . , max(i) and j=1, . . . , max(j) and $t_{i,0}.x=0$ and y values using $t_{i,j}.y=\text{round}(scalef*height_{i,0})+t_{i-1,j}.y$ for i=1, . . . , max(i) and j=0, . . . , max(j) and $t_{0,j}.x=0$. The targetMesh is in units of pixels and is used in the image rectification routines to dewarp the image content.

The piecewise rectification routine maps each pixel in the quadrilateral defined by the ruledMesh to the corresponding region in the targetMesh using standard perspective transform methods. In one aspect, OpenCV's four point method getPerspectiveTransform is used to calculate the perspective transform matrix. Then, OpenCV's dewarp routine warpPerspective is used to interpolate the input image pixels to the dewarped image. In an alternative aspect, each strip in the ruledMesh is interpolated from the input image to the dewarped image using the quadrilateral defined by the strip in the ruledMesh and the corresponding rectangle in the targetMesh.

In summary, a multi-scale page flattening technique is disclosed with polar projected edge map and text detection for book page boundary and gutter detection. Book page contour selection is achieved via contour grouping and curve completeness and fitting metrics. The book multi-scale contour refinement uses opposing vanishing point and piecewise Bezier curves to describe book contours for correction and interaction. An adaptive ruled mesh uses polygonal simplification of bounding curves, and the camera's focal length is calculated from page curl. Piecewise planar approximations of page normals are calculated for warped pages, and the relative text height is preserved in dewarping using robustness handling mathematics.

Figure 22B:
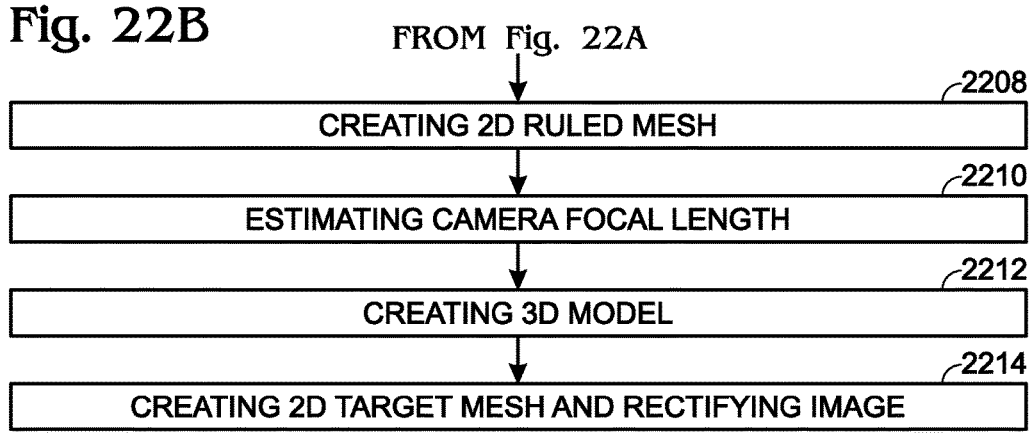

FIGS. 22A and 22B are a flowchart illustrating a method for the correction of a warped page image. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 2200.

Step 2202 accepts a camera image of a page. Typically, the focal length of the camera is unknown. Step 2204 creates a filtered edge map and identifies text-likely regions. Step 2206 projects the filtered edge map and text-likely regions into a polar coordinate system to determine page lines and warped image page curves. Step 2208 creates an adaptive 2D ruled mesh piecewise planar approximation of a warped page surface. Step 2210 estimates the camera focal length. Step 2212 creates a 3D model using the adaptive 2D ruled mesh and camera focal length estimate. Using the 3D model, Step 2214 creates a 2D target mesh rectifying the image of the page.

In a different aspect, subsequent to Step 2206, Step 2207a1 histograms an edge map into theta bins, and computes minimum and maximum theta angles for text-likely regions. Step 2207a2 localizes a first page line as the closest significant edge bin less than minimum text-likely region theta angle and a second page line as the closest significant edge bin greater than maximum text-likely region theta angle. Step 2207a3 identifies page gutters for images of adjacent pages, where the gutter is determined as the closest significant theta edge bin to the theta angle halfway between the minimum text-likely region theta angle and the maximum text-likely region angle.

In another aspect, Step 2207a4 filters curves identified as not being between page boundary lines, and divides remaining curves into a top set defined by curves that are within the region defined by boundary lines L1, L2, and LC1, and a bottom set defined by curves that are within the region defined by the boundary lines L1, L2, and LC2, where L1 is a left boundary, L2 is a right boundary, and LC2 is a bottom boundary. Step 2207a5 selects the top page curve as a top set curve with highest completeness and lowest curvature between the boundary lines L1 and L2. Step 2207*a*6 selects the bottom page curve as bottom set curve with the highest completeness and lowest curvature between the boundary lines L1 and L2. Step 2207*a*7 processes an image of adjacent pages, where each page is divided into upper and lower curve sets using boundary lines and gutter, and upper and lower curve lines are favored that join at the gutter.

In one aspect, subsequent to Step 2207*a*7, Step 2207*b*1 performs a multi-scale edge localization refinement for each page curve using the following substeps. Step 2207*b*2 transforms top and bottom page curves into point sets having a first resolution. Step 2207*b*3 scales the point sets to a second resolution, lower than the first resolution. Step 2207*b*4 creates a gradient image of the second resolution point sets. Step 2207*b*5 identifies zero crossings points in the gradient image as a page edge. Step 2207*b*6 scales the zero crossing points to the first resolution.

In another aspect, subsequent to Step 2207*b*6, Step 2207*b*7 independently fits a pair of warped image page curve sections to a corresponding pair of Bezier curves.

In one aspect, creating the adaptive 2D ruled mesh in Step 2208 includes creating a plurality of planar strips and estimating the camera focal length in Step 2210 includes independently estimating a camera focal length for each planar strip. Then, creating the 3D model in Step 2212 includes projecting the adaptive 2D ruled mesh onto a 3D warped page surface using the estimated camera focal length and an estimated surface normal of each planar strip from the adaptive 2D ruled mesh. In a different aspect, Step 2210 uses the adaptive 2D ruled mesh of the warped page surface to estimate the camera focal length.

For example, the adaptive 2D ruled mesh may be created using a polygonal approximation of the Bezier curves and polygonal simplification, with a fit tolerance (fitTH) of 0.5 pixels, to assist in generating the adaptive 2D ruled mesh.

In one aspect, creating the 2D target mesh in Step 2214 includes determining a resolution of a 2D target mesh in response to scaling 3D mesh width and height values, where the scale factor is determined by measuring an overall 3D page width and height and an input region width and height. In another aspect, rectifying the image of the page in Step 2214 includes using a perspective dewarp to interpolate image values from the adaptive 2D ruled mesh into the image defined by the 2D target rectilinear mesh.

A system and method have been provided for correcting a warped page camera image. Examples of particular mathematical techniques have been presented to illustrate the invention. However, the invention is not limited to merely these examples. Other variations and embodiments of the invention will occur to those skilled in the art.

I claim:

1. A method for the correction of a warped page image, the method comprising:
   accepting a camera image of a page;
   creating a filtered edge map and identifying text-likely regions;
   projecting the filtered edge map and text-likely regions into a polar coordinate system to determine page lines and warped image page curves;
   subsequent to projecting the filtered edge map and text-likely regions into the polar coordinate system, histogramming the filtered and projected edge map into theta bins, computing minimum and maximum theta angles for text-likely regions, localizing a first page line as a closest significant edge bin less than minimum text-likely region theta angle and a second page line as a closest significant edge bin greater than maximum text-likely region theta angle;
   creating an adaptive two-dimensional (2D) ruled mesh piecewise planar approximation of a warped page surface;
   using the created adaptive two-dimensional (2D) ruled mesh piecewise planar approximation of a warped page surface for estimating a camera focal length;
   creating a three-dimensional (3D) model using the adaptive 2D ruled mesh and camera focal length estimate; and,
   using the 3D model, creating a 2D target mesh rectifying the image of the page; wherein rectifying the image of the page includes using a perspective dewarp to interpolate image values from the adaptive 2D ruled mesh into the image defined by the 2D target rectilinear mesh.

2. The method of claim 1 further comprising:
   subsequent to projecting the filtered edge map and text-likely regions into the polar coordinate system, performing a multi-scale edge localization refinement for each determined page curve.

3. The method of claim 2 wherein performing the multi-scale refinement of the each determined page curves includes:
   transforming top and bottom page curves into point sets having a first resolution;
   scaling the point sets to a second resolution, lower than the first resolution;
   creating a gradient image of the second resolution point sets;
   identifying zero crossings points in the gradient image as a page edge; and,
   scaling the zero crossing points to the first resolution.

4. The method of claim 1 further comprising:
   subsequent to projecting the filtered edge map and text-likely regions into the polar coordinate system, independently fitting a pair of warped image page curve sections to a corresponding pair of Bezier curves.

5. The method of claim 1 wherein creating the adaptive 2D ruled mesh includes creating a plurality of planar strips; and,
   estimating a camera focal length includes independently estimating a camera focal length for each planar strip.

6. The method of claim 5 wherein creating the adaptive 2D ruled mesh includes using a polygonal approximation of Bezier curves and polygonal simplification, with a fit tolerance (fitTH) of 0.5 pixels, to assist in creating the adaptive 2D ruled mesh.

7. The method of claim 5 wherein creating the 3D model includes projecting the adaptive 2D ruled mesh onto a 3D warped page surface using the estimated camera focal length and an estimated surface normal of each planar strip from the adaptive 2D ruled mesh.

8. The method of claim 1 wherein estimating the camera focal length includes using the adaptive 2D ruled mesh of the warped page surface.

9. The method of claim 1 wherein creating the 2D target mesh includes determining a resolution of a 2D target mesh in response to scaling 3D mesh width and height values, where the scaling is determined by measuring an overall 3D page width and height and an input region width and height.

10. The method of claim 1, further comprising:
    identifying page gutters for images of adjacent pages, where each gutter is determined as the closest significant theta edge bin to a theta angle halfway between the minimum text-likely region theta angle and the maximum text-likely region angle.

11. The method of claim 1, further comprising determining a contour region of the page by:
   filtering curves not between page boundary lines, and dividing remaining curves into a top set defined by curves that are within the region defined by boundary lines L1, L2, and LC1, and a bottom set defined by curves that are within the region defined by the boundary lines L1, L2, and LC2, where L1 is a left boundary, L2 is a right boundary, and LC2 is a bottom boundary;
   selecting a top page curve as a top set curve with highest completeness and lowest curvature between the boundary lines L1 and L2; and,
   selecting a bottom page curve as bottom set curve with the highest completeness and lowest curvature between the boundary lines L1 and L2.

12. The method in claim 11 further comprising determining contour regions on two adjacent pages of a book, by:
   processing an image of adjacent pages, where each page is divided into upper and lower curve sets using boundary lines and gutter, and upper and lower curve lines are favored that join at the gutter.

13. A system for the correction of a warped page image, the system comprising:
   a non-transitory memory;
   a processor;
   an interface to accept a camera image of a page, and to supply a rectified image of the page;
   an image correction application stored in the memory and enabled as a sequence of processor executable steps for:
      creating a filtered edge map and identifying text-likely regions;
      projecting the filtered edge map and text-likely regions into a polar coordinate system to determine page lines and warped image page curves;
      subsequent to projecting the filtered edge map and text-likely regions into the polar coordinate system, histograms the filtered and projected edge map into theta bins, computes minimum and maximum theta angles for text-likely regions, and localizes a first page line as a closest significant edge bin less than minimum text-likely region theta angle and a second page line as a closest significant edge bin greater than maximum text-likely region theta angle;
      creating an adaptive two-dimensional (2D) ruled mesh piecewise planar approximation of a warped page surface;
      using the created adaptive two-dimensional (2D) ruled mesh piecewise planar approximation of a warped page surface for estimating a camera focal length;
      creating a three-dimensional (3D) model using the adaptive 2D ruled mesh and camera focal length estimate; and,
      using the 3D model, creating a 2D target mesh rectifying the image of the page; wherein the image correction application rectifies the image of the page using a perspective dewarp to interpolate image values from the adaptive 2D ruled mesh into the image defined by the 2D target rectilinear mesh.

14. The system of claim 13 wherein the image correction application, subsequent to projecting the filtered edge map and text-likely regions into the polar coordinate system, performs a multi-scale edge localization refinement for each determined page curve.

15. The system of claim 14 wherein the image correction application performs the multi-scale refinement of the determined page curves by:
   transforming top and bottom page curves into point sets having a first resolution;
   scaling the point sets to a second resolution, lower than the first resolution;
   creating a gradient image of the second resolution point sets;
   identifying zero crossings points in the gradient image as a page edge; and,
   scaling the zero crossing points to the first resolution.

16. The system of claim 13 wherein the image correction application, subsequent to projecting the filtered edge map and text-likely regions into the polar coordinate system, independently fits a pair of warped image page curve sections to a corresponding pair of Bezier curves.

17. The system of claim 13 wherein the image correction application creates the adaptive 2D ruled mesh with a plurality of planar strips, and independently estimates a camera focal length for each planar strip.

18. The system of claim 17 wherein the image correction application creates the adaptive 2D ruled mesh using a polygonal approximation of the Bezier curves and polygonal simplification, with a fit tolerance (fitTH) of 0.5 pixels, to assist in creating the adaptive 2D ruled mesh.

19. The system of claim 17 wherein the image correction application creates the 3D model by projecting the adaptive 2D ruled mesh onto a 3D warped page surface using the estimated camera focal length and an estimated surface normal of each planar strip from the adaptive 2D ruled mesh.

20. The system of claim 17 wherein the image correction application further creates the 2D target mesh with the plurality of planar strips by determining a resolution of a 2D target mesh in response to scaling 3D mesh width and height values, where the scaling is determined by measuring an overall 3D page width and height and an input region width and height.

21. The system of claim 13 wherein the image correction application estimates the camera focal length includes using the adaptive 2D ruled mesh of the warped page surface.

22. The system of claim 13 wherein the image correction application identifies page gutters for images of adjacent pages, where each gutter is determined as the closest significant theta edge bin to a theta angle halfway between the minimum text-likely region theta angle and the maximum text-likely region angle.

23. The system of claim 13, further comprising determining a contour region of the page by:
   when the image correction application filters curves not between page boundary lines, and divides remaining curves into a top set defined by curves that are within the region defined by boundary lines L1, L2, and LC1, and a bottom set defined by curves that are within the region defined by the boundary lines L1, L2, and LC2, where L1 is a left boundary, L2 is a right boundary, and LC2 is a bottom boundary; and,
   wherein the image correction application selects a top page curve as a top set curve with highest completeness and lowest curvature between the boundary lines L1 and L2, and selects a bottom page curve as bottom set curve with the highest completeness and lowest curvature between the boundary lines L1 and L2.

24. The system of claim 23, further comprising determining contour regions on two adjacent pages of a book, by:
   wherein when the image correction application processes an image of adjacent pages, where each page is divided into upper and lower curve sets using boundary lines and gutter, and upper and lower curve lines are favored that join at the gutter.

\* \* \* \* \*